(12) United States Patent
Fowers et al.

(10) Patent No.: US 10,331,445 B2
(45) Date of Patent: Jun. 25, 2019

(54) MULTIFUNCTION VECTOR PROCESSOR CIRCUITS

(71) Applicant: Microsoft Technology Licensing, LLC, Redmond, WA (US)

(72) Inventors: Jeremy Halden Fowers, Seattle, WA (US); Ming Gang Liu, Seattle, WA (US); Kalin Ovtcharov, Issaquah, WA (US); Steven Karl Reinhardt, Vancouver, WA (US); Eric Sen Chung, Woodinville, WA (US)

(73) Assignee: Microsoft Technology Licensing, LLC, Redmond, VA (US)

( * ) Notice: Subject to any disclaimer, the term of this patent is extended or adjusted under 35 U.S.C. 154(b) by 65 days.

(21) Appl. No.: 15/603,934

(22) Filed: May 24, 2017

(65) Prior Publication Data

US 2018/0341486 A1 Nov. 29, 2018

(51) Int. Cl.
*G06F 9/30* (2018.01)
*G06F 9/38* (2018.01)

(52) U.S. Cl.
CPC ...... *G06F 9/30036* (2013.01); *G06F 9/30014* (2013.01); *G06F 9/3836* (2013.01); *G06F 9/3867* (2013.01)

(58) Field of Classification Search
None
See application file for complete search history.

(56) References Cited

U.S. PATENT DOCUMENTS

| 5,805,875 | A | 9/1998 | Asanovic |
| 8,028,284 | B2 * | 9/2011 | Ohkawa ........... G06F 15/16 712/214 |
| 9,275,014 | B2 | 3/2016 | Khan |
| 9,369,397 | B1 * | 6/2016 | Pathakota ........ H04L 47/527 |
| 2004/0003206 | A1 * | 1/2004 | May .............. G06F 9/30036 712/218 |
| 2005/0257024 | A1 * | 11/2005 | Ray ................ G06F 9/3001 712/11 |
| 2008/0319933 | A1 | 12/2008 | Moussa et al. |

(Continued)

FOREIGN PATENT DOCUMENTS

CN 106096728 A 11/2016
WO 2015023465 A1 2/2015

OTHER PUBLICATIONS

Zhang, et al., "Optimizing FPGA-based Accelerator Design for Deep Convolutional Neural Networks", In Proceedings of ACM/SIGDA International Symposium on Field-Programmable Gate Arrays, Feb. 22, 2015, pp. 161-170.

(Continued)

*Primary Examiner* — Eric Coleman
(74) *Attorney, Agent, or Firm* — The Watson I.P. Group, PLC; Vladen M. Vasiljevic

(57) ABSTRACT

A processor circuit is provided that includes an input terminal and an output terminal, a plurality of vector processor operation circuits, a selector circuit coupled to the input terminal, the output terminal, and each of the vector processor operation circuits, and a scheduler circuit adapted to control the selector circuit to configure a vector processing pipeline comprising zero, one or more of the vector processor operation circuits in any order between the input terminal and the output terminal.

20 Claims, 13 Drawing Sheets

(56) References Cited

U.S. PATENT DOCUMENTS

| | | | |
|---|---|---|---|
| 2009/0307472 A1* | 12/2009 | Essick, IV | G06F 9/30072 |
| | | | 712/241 |
| 2014/0019726 A1* | 1/2014 | Toi | G06F 9/3001 |
| | | | 712/221 |
| 2014/0198803 A1* | 7/2014 | Dalal | G06F 13/16 |
| | | | 370/413 |
| 2015/0149747 A1* | 5/2015 | Lee | G06F 9/30065 |
| | | | 712/241 |
| 2016/0379115 A1 | 12/2016 | Burger et al. | |
| 2017/0031689 A1 | 2/2017 | Wokhlu et al. | |

OTHER PUBLICATIONS

Qiao, et al., "FPGA-accelerated deep convolutional neural networks for high throughput and energy efficiency", In Publication of John Wiley & Sons Ltd—Concurrency and Computation: Practice and Experience, May 6, 2016, 20 pages.

Aliaga, et al., "System-on-Chip Implementation of Neural Network Training on FPGA", In International Journal on Advances in Systems and Measurements, vol. 2, No. 1, 2009, pp. 44-55.

Dai, et al., "Dynamic Hazard Resolution for Pipelining Irregular Loops in High-Level Synthesis", In Proceedings of 25th ACM/SIGDA International Symposium on Field-Programmable Gate Arrays, Feb. 22, 2017, pp. 189-194.

Feldman, Michael, "Microsoft Goes All in for FPGAs to Build Out AI Cloud", https://www.top500.org/news/microsoft-goes-all-in-for-fpgas-to-build-out-cloud-based-ai/, Sep. 27, 2016, 3 pages.

"International Search Report and Written Opinion Issued in PCT Application No. PCT/US2018/028972", dated Jul. 30, 2018, 14 Pages.

* cited by examiner

| INPUT QUEUE 402 |
|---|
| VAi |
| VBi |
| VCi |

FIG. 5A

| | COMMAND QUEUE 406 |
|---|---|
| C1 | IN → MUL(w) → ADD(x) → OUT |
| C2 | IN → ADD(y) → MUL(z) → OUT |
| C3 | IN → TANH → OUT |

FIG. 5B

| OUTPUT QUEUE 404 |
|---|
| VAo |
| VBo |
| VCo |

FIG. 5C

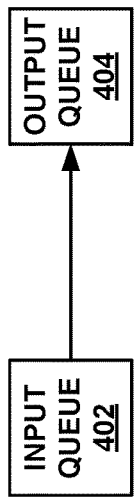
FIG. 6A2  FIG. 6B2  FIG. 6C2  FIG. 6D2
CA: IN → OUT
FIG. 6A1
CB: IN → ReLU → OUT
FIG. 6B1
CC: IN → MUL(x) → OUT
FIG. 6C1
CD: IN → ADD(x) → OUT
FIG. 6D1

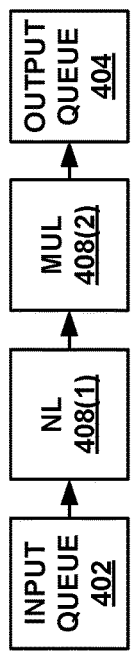
FIG. 6E2
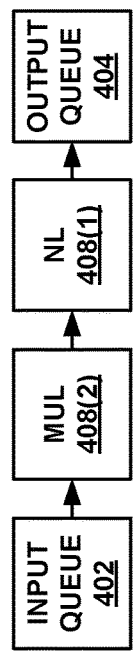
FIG. 6F2
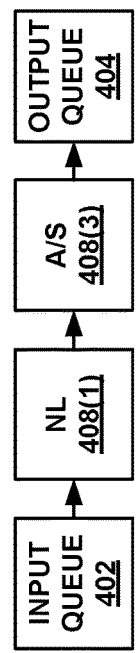
FIG. 6G2
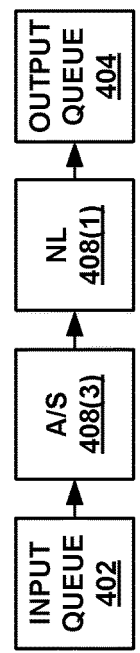
FIG. 6H2
CE: IN → ReLU → MUL(x) → OUT
FIG. 6E1
CF: IN → MUL(x) → ReLU → OUT
FIG. 6F1
CG: IN → ReLU → ADD(x) → OUT
FIG. 6G1
CH: IN → ADD(x) → ReLU → OUT
FIG. 6H1

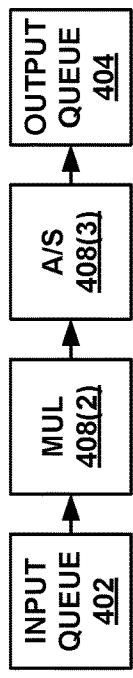
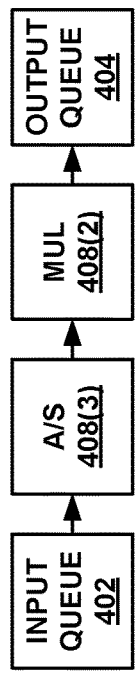
CI: IN → MUL(x) → ADD(y) → OUT
FIG. 6I1
CJ: IN → ADD(x) → MUL(y) → OUT
FIG. 6J1
CK: IN → ReLU → MUL(x) → ADD(y) → OUT
FIG. 6K1
CL: IN → ReLU → ADD(x) → MUL(y) → OUT
FIG. 6L1

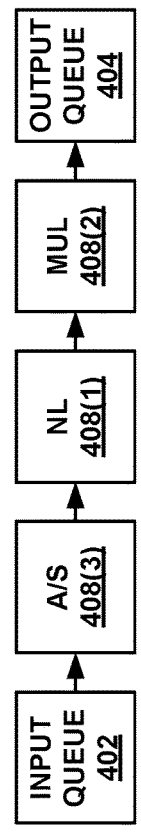
CM: IN → MUL(x) → ReLU → ADD(y) → OUT
FIG. 6M1
CN: IN → MUL(x) → ADD(y) → ReLU → OUT
FIG. 6N1
CO: IN → ADD(x) → ReLU → MUL(y) → OUT
FIG. 6O1
CP: IN → ADD(x) → MUL(y) → ReLU → OUT
FIG. 6P1

| COMMAND CHAIN | COMMAND FLOW | CHAIN DELAY LATENCY (CYCLES) | | | | |
|---|---|---|---|---|---|---|
| | | INQ | NL | MUL | A/S | OUTQ |
| C1 | IN → MUL(w) → ADD(x) → OUT | 0 | - | 0 | 7 | 17 |
| C2 | IN → ADD(y) → MUL(z) → OUT | 0 | - | 10 | 0 | 17 |
| C3 | IN → TANH → OUT | 0 | 0 | - | - | 3 |

FIG. 8

| CYCLE | EVENT | BUSY COUNTERS (CYCLES) ||||| 
|---|---|---|---|---|---|---|
| | | INQ | NL | MUL | A/S | OUTQ |
| 0 | start | 0 | 0 | 0 | 0 | 0 |
| 1 | start to stream input vector VAi; update busy counts | 9 | 0 | 9 | 16 | 26 |
| 2 | stream | 8 | 0 | 8 | 15 | 25 |
| <7 cycles> | stream | ... | ... | ... | ... | ... |
| 10 | input vector VAi streaming complete | 0 | 0 | 0 | 7 | 17 |
| <6 cycles> | processing C1 | ... | ... | ... | ... | ... |
| 17 | processing C1 | 0 | 0 | 0 | 0 | 10 |
| 18 | start to stream input vector VBi; update busy counts | 9 | 0 | 19 | 9 | 26 |
| 19 | stream | 8 | 0 | 18 | 8 | 25 |
| <7 cycles> | stream | ... | ... | ... | ... | ... |
| 27 | input vector VBi streaming complete | 0 | 0 | 10 | 0 | 17 |
| 28 | processing C2 | 0 | 0 | 9 | 0 | 16 |
| <12 cycles> | processing C2 | ... | ... | ... | ... | ... |
| 40 | processing C2 | 0 | 0 | 0 | 0 | 3 |
| 41 | start to stream input vector VCi; update busy counts | 9 | 9 | 0 | 0 | 12 |
| 42 | stream | 8 | 8 | 0 | 0 | 11 |
| <7 cycles> | stream | ... | ... | ... | ... | ... |
| 50 | input vector VCi streaming complete | 0 | 0 | 0 | 0 | 3 |
| 51 | processing C3 | 0 | 0 | 0 | 0 | 2 |
| 52 | processing C3 | 0 | 0 | 0 | 0 | 1 |
| 53 | complete | 0 | 0 | 0 | 0 | 0 |

FIG. 9

MULTIFUNCTION VECTOR PROCESSOR CIRCUITS

BACKGROUND

Machine learning algorithms, such as deep neural networks, are increasingly being used for many artificial intelligence applications, such as computer vision, speech recognition, and robotics. Implementing machine learning algorithms typically requires high computational complexity. Indeed, running machine learning algorithms on a general-purpose central processing unit (CPU) can be extremely expensive, and in some cases quite impractical. Accordingly, techniques that enable efficient processing of machine learning algorithms to improve energy-efficiency and throughput are highly desirable.

Hardware acceleration components, such as field programmable gate arrays, have been used to supplement the processing performance of general-purpose CPUs for implementing machine learning algorithms.

SUMMARY

According to a first aspect, a processor circuit is provided that includes an input terminal and an output terminal, a plurality of vector processor operation circuits, a selector circuit coupled to the input terminal, the output terminal, and each of the vector processor operation circuits, and a scheduler circuit adapted to control the selector circuit to configure a vector processing pipeline comprising zero, one or more of the vector processor operation circuits in any order between the input terminal and the output terminal.

According to a second aspect, a computing device is provided that includes a hardware accelerator including hardware logic circuitry configured to perform a plurality of vector processing operations on input vectors. The hardware accelerator includes a vector processor including hardware logic circuitry configured to provide a plurality of vector processor operation circuits, and a scheduler including hardware logic circuitry configured to selectively configure a plurality of vector processing pipelines including zero, one or more of the vector processor operation circuits in any order, each vector processing pipeline associated with a corresponding one of the input vectors.

According to a third aspect, a method is provided that includes using hardware logic circuitry to perform a plurality of vector processing operations on input vectors. The hardware logic circuitry includes a vector processor including hardware logic circuitry configured to provide a plurality of vector processor operation circuits, and a scheduler including hardware logic circuitry configured to selectively configure a plurality of vector processing pipelines including zero, one or more of the vector processor operation circuits in any order, each vector processing pipeline associated with a corresponding one of the input vectors.

The above-summarized functionality can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5A is an example input queue for the example vector processor circuits of FIGS. 4A-4C.

FIG. 5B is an example command queue for the example vector processor circuits of FIGS. 4A-4C.

FIG. 5C is an example output queue for the example vector processor circuits of FIGS. 4A-4C.

FIGS. 6A1-6P1 and 6A2-6P2 are example vector processing command chains and corresponding vector processing pipelines for the example vector processor circuit of FIGS. 4A-4C.

FIG. 8 is a diagram of example chain delay latencies for the example vector processing command chains of FIG. 5B.

FIG. 9 is a diagram of example busy counters for the example vector processor circuit of FIGS. 4A-4C.

Figure 1:
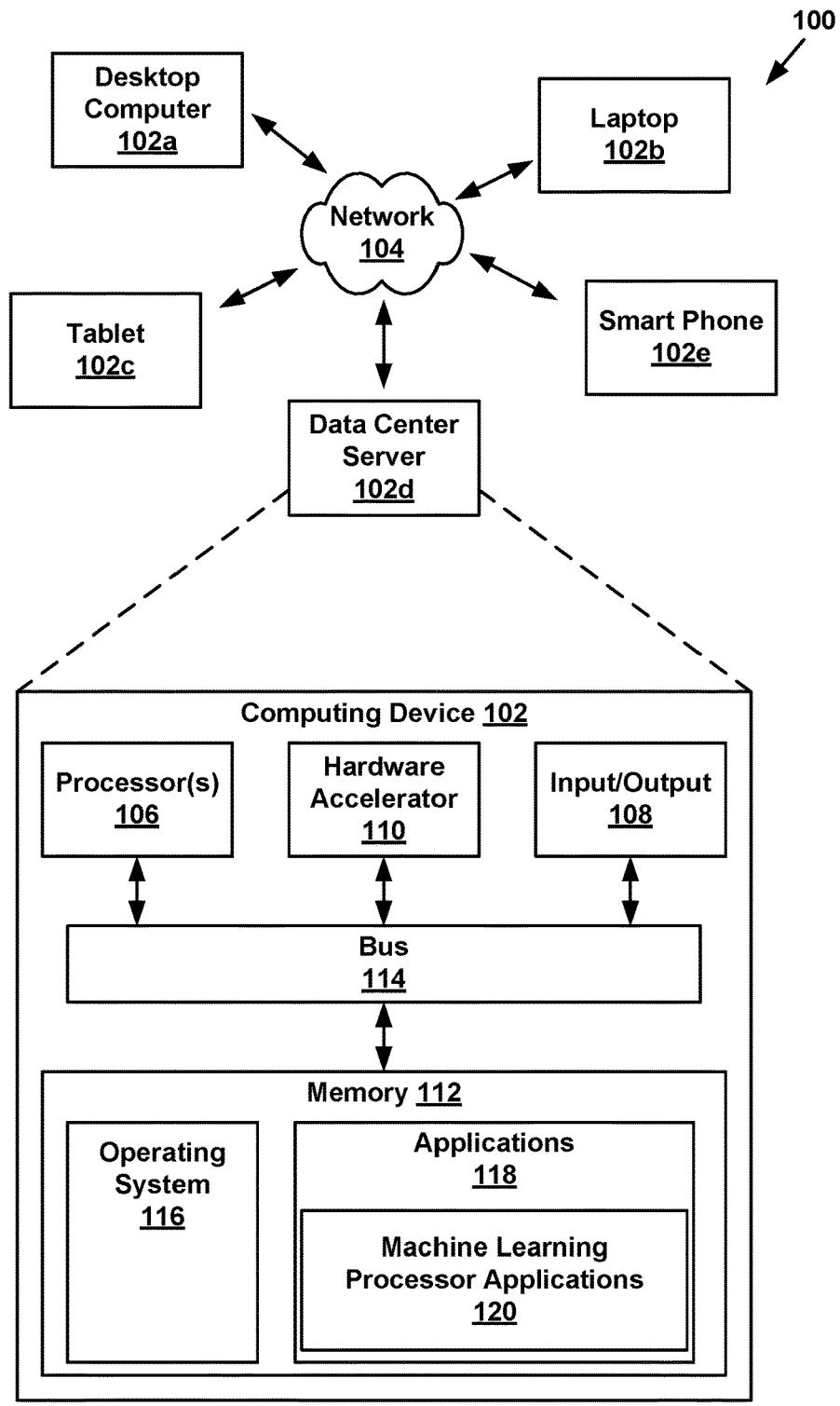
FIGS. 1-3 are block diagrams depicting example environments in which techniques described herein may be implemented.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Machine learning algorithms often perform numerous vector operations, such as element-wise multiplication, addition or subtraction of two vectors, and non-linear processing of vectors (e.g., application of non-linear functions, such as sigmoid, hyperbolic tangent, and rectified linear unit (ReLU)). Although such vector processing operations could be performed by a general-purpose CPU, the computation rate for machine learning algorithms often exceeds the capabilities of even the fastest general-purpose CPU.

Machine learning algorithms often implement numerous sequences of vector processing operations, with the specific vector processing operations and the specific order of vector processing operations changing from sequence-to-sequence. For example, a machine learning algorithm may implement the following three sequences of vector processing operations: (1) a first vector processing operation sequence, in which a first input vector (e.g., vector A) is multiplied by a second vector (e.g., vector B), the result is added to a third vector (e.g., vector C), and the resulting sum is processed by a non-linear function (e.g., hyperbolic tangent); (2) a second vector processing operation sequence, in which a second input vector (e.g., vector D) is added to a fourth vector (e.g., vector E), and the resulting sum is multiplied by a fifth vector (e.g., vector F); and (3) a third vector processing operation sequence, in which a third input vector (e.g., vector G) is processed by non-linear function (e.g., sigmoid).

As described in more detail below, technology is described for hardware implemented vector processor circuits that may be used to dynamically configure vector processing pipelines, with each vector processing pipeline configured to perform a sequence of vector processing operations on an associated corresponding input vector.

In an implementation, a vector processor circuit receives instructions that specify the specific vector processing operations and the order of such vector processing operations to be performed on associated corresponding input vectors.

In an implementation, the vector processor circuit dynamically configures vector processing pipelines according to the instructions, and processes input vectors using the associated corresponding dynamically configured vector processing pipelines.

In an implementation, the received instructions do not include scheduling information that specifies timing for dynamically configuring vector processing pipelines for processing associated corresponding input vectors.

In an implementation, the vector processor circuit determines such scheduling information in real time based on the vector processing operations specified in the received instructions, while implementing the dynamically configured vector processing pipelines.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof.

In one case, the illustrated separation of various components in the figures into distinct units may reflect the use of corresponding distinct physical and tangible components in an actual implementation. Alternatively, or in addition, any single component illustrated in the figures may be implemented by more than one actual physical component. Alternatively, or in addition, the depiction of any two or more separate components in the figures may reflect different functions performed by a single actual physical component.

Other figures describe concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into multiple component blocks, and certain blocks can be performed in an order that differs from that which is illustrated herein (including a parallel manner of performing the blocks). Blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional. That is, other features can be considered as optional, although not explicitly identified in the text. Further, any description of a single entity is not intended to preclude the use of more than one such entity. Similarly, a description of multiple entities is not intended to preclude the use of a single entity. Further, although the description may explain certain features as alternative ways of carrying out identified functions or implementing identified mechanisms, the features also can be combined together in any combination. Finally, the terms "exemplary" or "illustrative" refer to an implementation among potentially many implementations.

FIG. 1 illustrates an example environment 100 in which example vector processor circuits, such as for use with machine learning algorithms, as described herein can operate. In some examples, the various devices and/or components of environment 100 include a variety of computing devices 102. By way of example and not limitation, computing devices 102 may include devices 102a-102e. Although illustrated as a diverse variety of device types, computing devices 102 can be other device types and are not limited to the illustrated device types. In some implementations any of a number of computing devices 102 may be interconnected via a network 104.

Network 104 can include, but is not limited to, a cellular network (e.g., wireless phone), a point-to-point dial up connection, a satellite network, the Internet, a local area network, a wide area network, a WiFi network, an ad hoc network, an intranet, an extranet, or a combination thereof. Network 104 may include one or more connected networks (e.g., a multi-network environment). Network 104 may include one or more data centers that store and/or process information (e.g., data) received from and/or transmitted to computing devices 102.

In an implementation, computing devices 102 can include any type of device with one or multiple processors 106 operably connected to an input/output interface 108, a hardware accelerator 110, and a memory 112, e.g., via a bus 114. Computing devices 102 can include personal computers such as, for example, desktop computers 102a, laptop computers 102b, tablet computers 102c, data center servers 102d (or servers is any other environment), smart phones 102e, electronic book readers, wearable computers, automotive computers, gaming devices, etc. In an implementation, computing devices 102 need not include processor 106, and may be a hardware appliance.

Computing devices 102 also can include other computing devices such as, for example, server computers, thin clients, terminals, and/or work stations. In some examples, computing devices 102 can include, for example, components for integration in a computing device, appliances, or other sorts of devices.

In some examples, some or all of the functionality described as being performed by computing devices 102 may be implemented by one or more remote peer computing devices, a remote server or servers, or a cloud computing resource. In some examples, a computing device 102 may include an input port to receive an input data sequence. Computing device 102 may further include one or multiple processors 106 to perform machine learning processing, for example.

In some examples, as shown regarding device 102*d*, memory 112 can store instructions executable by the processor(s) 106 including an operating system 116, and programs or applications 118 that are loadable and executable by processor(s) 106. Applications 118 may include machine learning processor applications 120 that may be executed to operate hardware accelerator 110, for example. The one or more processors 106 may include one or more central processing units (CPUs), graphics processing units (GPUs), video buffer processors, and so on.

In some implementations, machine learning processor applications 120 include executable code stored in memory 112 and executable by processor(s) 106 to receive and implement machine learning algorithms that include data sequences (e.g., streaming data or data files), locally or remotely by computing device 102, via input/output interface 108. In some examples, the data sequences may be associated with one or more applications 118. Machine learning processor applications 120 may operate in combination with hardware accelerator 110 to apply any of a number of processes, such as vector processing operators, used to process data stored in memory 112 or received via input/output interface 108.

Although certain blocks have been described as performing various operations, the modules are merely examples and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, some or all of the functionality described herein can be performed, at least in part, by one or more hardware logic circuits. For example, and without limitation, illustrative types of hardware logic circuits that can be used include a field programmable gate array (FPGA) device, an application-specific integrated circuit (ASIC) device, a GPU, a massively parallel processor array (MPPA) device, an application-specific standard product (ASSP) device, a system-on-a-chip device (SOC) device, a complex programmable logic device (CPLD), a custom integrated circuit, etc.

For example, all or a portion of hardware accelerator 110 may be implemented on one or more FPGAs, ASICs, GPUs, MPPAs, ASSPs, SOCs, CPLDs, and/or custom integrated circuits. The term "hardware" accelerator broadly encompasses different ways of leveraging a hardware device to perform a function, including, for instance, at least: a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run on MPPAs of soft processors or the like; e) a case in which at least some tasks run as software on hard ASIC processors or the like, and so on, or any combination thereof.

The following explanation will present a primary example in which hardware accelerators, such as hardware accelerator 110, correspond to one or more FPGA devices, although, as noted, hardware accelerators may be constructed using other types of hardware logic circuits.

Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, or other transmission mechanism. As defined herein, computer storage media does not include communication media. In various examples, memory 112 is an example of computer storage media storing computer-executable instructions.

In various examples, an input device of input/output interface 108 can be a direct-touch input device (e.g., a touch screen), an indirect-touch device (e.g., a touch pad), an indirect input device (e.g., a mouse, keyboard, a camera or camera array, etc.), or another type of non-tactile device, such as an audio input device.

Computing device(s) 102 also may include one or more input/output interfaces 108 to allow computing device 102 to communicate with other devices. Input/output interface 108 can include one or more network interfaces to enable communications between computing device 102 and other networked devices such as other device(s) 102. Input/output interface 108 can allow a computing device 102 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

Figure 2:
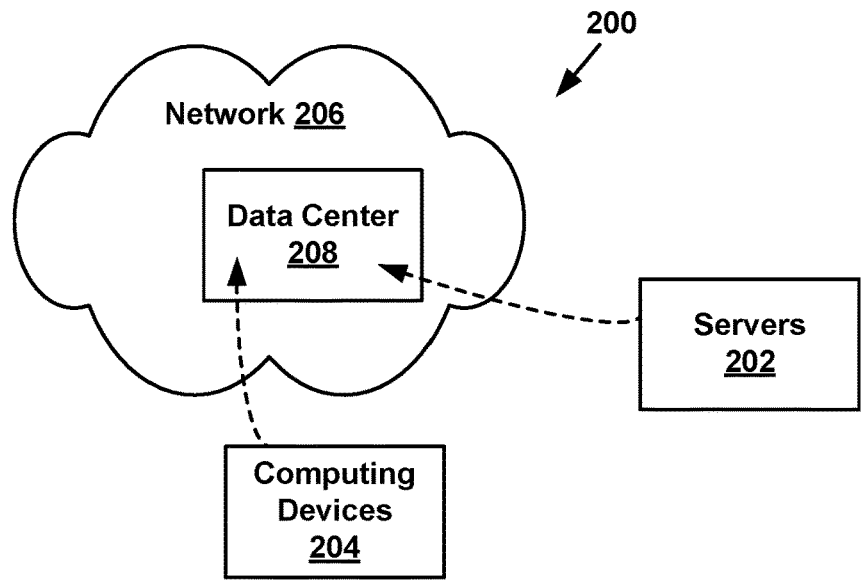

FIG. 2 is a block diagram depicting an example system 200 that includes any number of servers 202 and computing devices 204 in communication with a network 206. At least a portion of servers 202 and/or computing devices 204 are located in one or more data centers 208, as indicated by the dashed arrows. Such communication, for example, may involve transmitting and/or receiving data among servers 202, computing devices 204, and data center 208 via network 206 at relatively fast network rates. For example, data received in data center 208 may include network data traffic via the Internet (e.g., network 206), for example. Such data may be received by the data center at network speeds that exceed 10 Gb/sec, for example.

Individual servers 202 and computing devices 204, for example, may be the same as or similar to computing device 102 described above and illustrated in FIG. 1. Network 206 may the same as or similar to network 104, for example, described in FIG. 1. In some examples, data center 208 is a facility used to house computer systems and associated components, such as telecommunications and storage systems. Such a data center may include, among other things, redundant or backup power supplies, redundant data communications connections, environmental controls (e.g., air conditioning, fire suppression), and various security devices. Data centers may involve industrial-scale operations and relatively large amount of electrical power for supporting operations.

Figure 3:
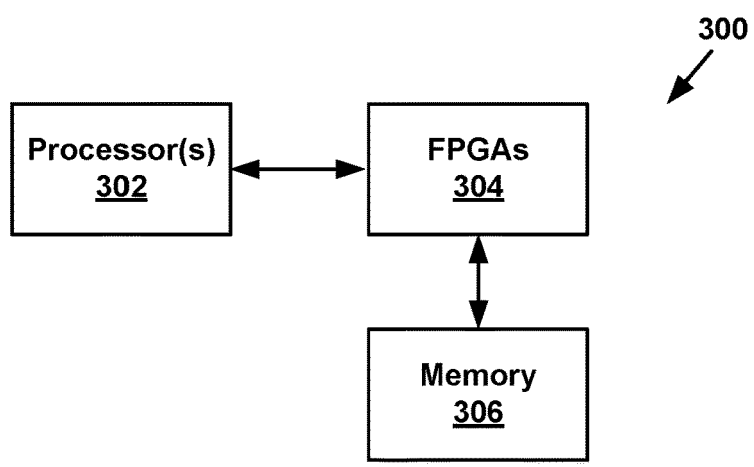

FIG. 3 is a block diagram depicting an example system 300 that includes any number of processors 302 and FPGAs 304. System 300, which may be incorporated in a data center (e.g., data center 208 of FIG. 2) for example, may be similar to or the same as computing device 102 described above and illustrated in FIG. 1. System 300 may be configured to implement machine learning algorithms that are received into the data center or transmitted from the data center. In some implementations, such data may be transmitted through FPGAs 304, for example. FPGAs 304 may directly communicate with memory 306, which may store data during machine learning processing performed with FPGAs 304.

In some examples, FPGAs 304 may be the same as or similar to hardware accelerator 110 described above and illustrated in FIG. 1. In various implementations, system 300 may include any number of ASICs, GPUs, MPPAs, ASSPs, SOCs, CPLDs, custom integrated circuits, or a combination thereof, in addition to or in place of FPGAs 304. In other words, for example, machine learning processor applications that perform vector processing operations described herein may be implemented using any of a number of hardware configurations, such as those listed above.

Figure 4A:
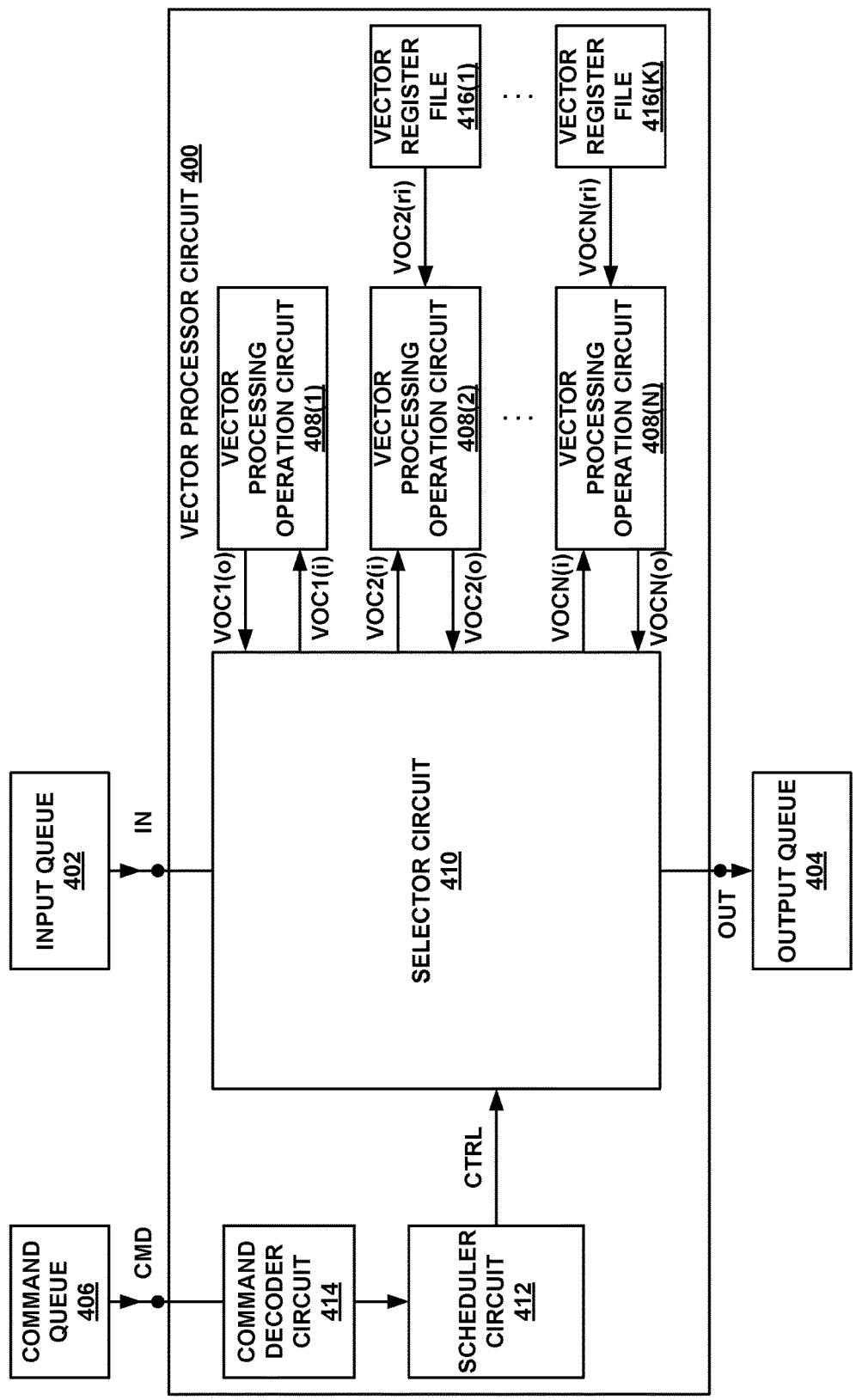
FIGS. 4A-4C are block diagrams of example vector processor circuits.

FIG. 4A is a block diagram of an implementation of a vector processor circuit 400. In an implementation, vector processor circuit 400 is implemented in a hardware accelerator, such as hardware accelerator 110 of FIG. 1, and includes an input terminal IN coupled to an input queue 402, an output terminal OUT coupled to an output queue 404, and a command terminal CMD coupled to a command queue 406.

As described in more detail below, vector processor circuit 400 receives vector processing command chains from command queue 406, with each vector processing command chain associated with a corresponding input vector from input queue 402. In an implementation, each vector processing command chain specifies vector processing operations to be performed by vector processor circuit 400 on the corresponding input vector. In an implementation, vector processor circuit 400 dynamically configures vector processing pipelines between input queue 402 and output queue 404 to implement the vector processing operations specified in the received vector processing command chains, with each vector processing pipeline associated with a corresponding one of the input vectors. In an implementation, vector processor circuit 400 processes each received input vector using the corresponding vector processing pipeline, and provides corresponding output vectors to output queue 404.

FIG. 5A illustrates an example input queue 402, FIG. 5B illustrates an example command queue 406, and FIG. 5C illustrates an example output queue 404. In an implementation, input queue 402 includes three input vectors VAi, VBi, and VCi, and command queue 406 includes three vector processing command chains C1, C2, and C3 corresponding to input vectors VAi, VBi, and VCi, respectively. In an implementation, output queue 404 includes three output vectors VAo, VBo, and VCo corresponding to input vectors VAi, VBi, and VCi, respectively, and vector processing command chains C1, C2, and C3, respectively. Persons of ordinary skill in the art will understand that input queue 402, command queue 406, and output queue 404 each may include more or fewer than three elements.

Vector processing command chain C1 specifies vector processing operations to be performed on corresponding input vector VAi to produce corresponding output vector VAo. In an implementation, vector processing command chain C1 specifies that input vector VAi is to be retrieved from input queue 402 and then multiplied by a vector w, the multiplication result is to be added to a vector x, and the summation result is to be stored in output queue 404 as corresponding output vector VAo.

Vector processing command chain C2 specifies vector processing operations to be performed on corresponding input vector VBi to produce corresponding output vector VBo. In an implementation, vector processing command chain C2 specifies that input vector VBi is to be retrieved from input queue 402 and then added to a vector y, the summation result is to be multiplied by a vector z, and the multiplication result is to be stored in output queue 404 as corresponding output vector VBo.

Vector processing command chain C3 specifies vector processing operations to be performed on corresponding input vector VCi to produce corresponding output vector VCo. In an implementation, vector processing command chain C3 specifies that input vector VCi is to be retrieved from input queue 402 and processed with a hyperbolic tangent function, and the processed result is to be stored in output queue 404 as corresponding output vector VCo.

In the examples described above, vector processing command chain C1 and vector processing command chain C2 each include two vector processing operations, and vector processing command chain C3 includes a single vector processing operation. Persons of ordinary skill in the art will understand that vector processing command chains may include zero, one, two, three or more vector processing operations.

Referring again to FIG. 4A, vector processor circuit 400 receives input vectors (e.g., VAi, VBi and VCi in FIG. 5A) from input queue 402, and receives vector processing command chains (e.g., C1, C2 and C3 in FIG. 5B) from command queue 406, with each vector processing command chain associated with a corresponding one of the input vectors (e.g., VAi, VBi and VCi, respectively). Vector processor circuit 400 dynamically configures vector processing pipelines between input queue 402 and output queue 404 to implement vector processing operations specified in the received vector processing command chains, with each vector processing pipeline associated with a corresponding one of the received input vectors. Vector processor circuit 400 processes each received input vector using the corresponding vector processing pipeline, and provides corresponding output vectors (e.g., VAo, VBo and VCo, respectively) to output queue 404.

In an implementation, vector processor circuit 400 includes vector processing operation circuits 408(1), 408(2), . . . , 408(N), each of which is configured to perform a corresponding vector processing operation. As described in more detail below, vector processor circuit 400 dynamically configures vector processing pipelines including some, all or none of vector processing operation circuits 408(1), 408(2), . . . , 408(N) between input queue 402 and output queue 404.

In implementations, one or more of vector processing operation circuits 408(1), 408(2), . . . , 408(N) is configured to perform vector-vector operations (e.g., elementwise vector-vector multiplication, addition, subtraction or any other vector-vector operation) or vector operations (e.g., sigmoid, hyperbolic tangent, ReLU, or other non-linear operation). In an implementation, each of vector processing operation circuits 408(1), 408(2), . . . , 408(N) is configured as a floating point processor circuit. In other implementations, each of vector processing operation circuits 408(1), 408(2), . . . , 408(N) may be configured as any of floating point, block floating point, integer fixed point, and any other numerical format processor circuits.

Figure 4B:
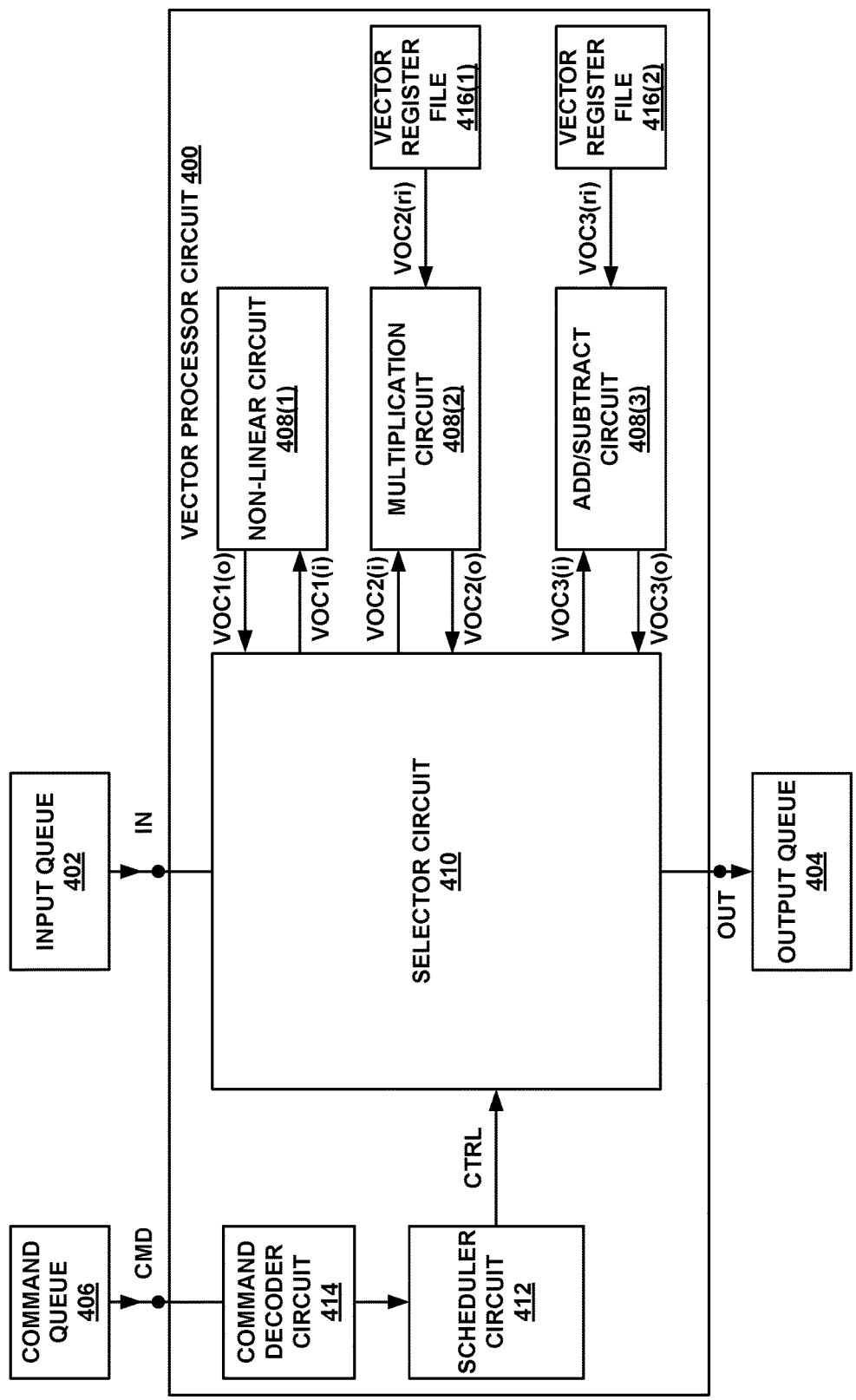

FIG. 4B depicts an implementation of vector processor circuit 400 with N=3. In an implementation, vector processing operation circuit 408(1) is configured to perform a non-linear vector processing operation (e.g., sigmoid, hyperbolic tangent, ReLU, etc.), vector processing operation circuit 408(2) is configured to perform elementwise vector-vector multiplication, and vector processing operation circuit 408(2) is configured to perform addition/subtraction. In other implementations, N may be less than or greater than 3. In other implementations, vector processing operation circuits 408(1), 408(2), . . . , 408(N) may be configured to perform other vector processing operations, and more than one of vector processing operation circuits 408(1), 408(2), . . . , 408(N) may be configured to perform the same vector processing operation.

Referring again to FIG. 4A, vector processor circuit 400 dynamically configures vector processing pipelines including some, all or none of vector processing operation circuits 408(1), 408(2), . . . , 408(N) between input queue 402 and output queue 404 to implement vector processing operations specified in the received vector processing command chains (e.g., C1, C2 and C3 in FIG. 5B) from command queue 406, with each vector processing command chain associated with a corresponding one of the input vectors (e.g., VAi, VBi and VCi, respectively). Vector processor circuit 400 processes each received input vector (e.g., VAi, VBi and VCi in FIG. 5A) using the corresponding vector processing pipeline, and provides corresponding output vectors (e.g., VAo, VBo and VCo, respectively) to output queue 404.

In an implementation, each of vector processing operation circuits 408(1), 408(2), . . . , 408(N) includes an input terminal and an output terminal. In implementations, some or all of vector processing operation circuits 408(1), 408(2), . . . , 408(N) include two input terminals. In other implementations, some or all of vector processing operation circuits 408(1), 408(2), . . . , 408(N) may include more than two input terminals, and/or more than one output terminal.

In an implementation, vector processor circuit 400 includes a selector circuit 410 that is coupled to input queue 402, output queue 404, and to an input terminal and an output terminal of each of vector processing operation circuits 408(1), 408(2), . . . , 408(N). In an implementation, selector circuit 410 also is coupled to receive control signals CTRL from a scheduler circuit 412, which is coupled via a command decoder circuit 414 to command queue 406.

In an implementation, vector processor circuit 400 also includes vector register files 416(1), . . . , 416(K), each of which is coupled to a second input terminal of a corresponding one of vector processing operation circuits 408(1), 408(2), . . . , 408(N). As described in more detail below, under the control of control signals CTRL from scheduler circuit 412, selector circuit 410 dynamically configures vector processing pipelines including some, all or none of vector processing operation circuits 408(1), 408(2), . . . , 408(N) between input queue 402 and output queue 404 to implement vector processing operations specified in the received vector processing command chains (e.g., C1, C2 and C3 in FIG. 5B) from command queue 406, with each vector processing command chain associated with a corresponding one of the input vectors (e.g., VAi, VBi and VCi, respectively). Vector processor circuit 400 processes each received input vector (e.g., VAi, VBi and VCi) using the corresponding vector processing pipeline, and provides corresponding output vectors (e.g., VAo, VBo and VCo, respectively) to output queue 404.

In an implementation, vector processing operation circuit 408(1) includes an input terminal VOC1(i) coupled to selector circuit 410 and an output terminal VOC1(o) coupled to selector circuit 410, and is configured to receive a vector at input terminal VOC1(i), perform a vector processing operation on the received vector, and provide an output vector at output terminal VOC1(o). For example, referring to FIG. 4B, in an implementation, vector processing operation circuit 408(1) performs a non-linear vector processing operation (e.g., sigmoid, hyperbolic tangent, ReLU, etc.) on the received vector at input terminal VOC1(i), and provides the result at output terminal VOC1(o).

Referring again to FIG. 4A, in an implementation, vector processing operation circuit 408(2) includes a first input terminal VOC2(i) coupled to selector circuit 410, a second input terminal VOC2(ri) coupled to vector register file 416(1), and an output terminal VOC2(o) coupled to selector circuit 410, and is configured to receive a first vector at first input terminal VOC2(i), receive a second vector at second input terminal VOC2(ri), perform a vector processing operation on the received first and second vectors, and provide an output vector at output terminal VOC2(o). For example, referring to FIG. 4B, in an implementation, vector processing operation circuit 408(2) performs elementwise vector-vector multiplication of the received first and second vectors, and provides the multiplication result at output terminal VOC2(O). In other implementations, second input terminal VOC2(ri) may be coupled to an external vector register file, memory, processor circuit, or other source of vector data.

Referring again to FIG. 4A, in an implementation, vector processing operation circuit 408(N) includes a first input terminal VOCN(i) coupled to selector circuit 410, a second input terminal VOCN(ri) coupled to vector register file 416(K), and an output terminal VOCN(o) coupled to selector circuit 410, and is configured to receive a first vector at first input terminal VOCN(i), receive a second vector at second input terminal VOCN(ri), perform a vector processing operation on the received first and second vectors, and provide an output vector at output terminal VOCN(o). For example, referring to FIG. 4B, in an implementation, vector processing operation circuit 408(3) adds the received first and second vectors, and provides the summation result at output terminal VOC3(O). In other implementations, second input terminal VOCN(ri) may be coupled to an external vector register file, memory, processor circuit, or other source of vector data.

Referring again to FIG. 4A, in other implementations, vector processing operation circuits 408(1), 408(2), . . . , 408(N) may perform other or different vector processing operations. In implementations, vector processing operation circuits 408(1), 408(2), . . . , 408(N) may include one or more of each type of vector processing operation. For example, vector processing operation circuits 408(1), 408(2), . . . , 408(N) may include a single vector processing operation circuit that performs elementwise vector-vector multiplication, two vector processing operation circuits that each perform addition/subtraction, four vector processing operation circuits that each perform non-linear operations, and so on.

Scheduler circuit 412 provides control signals CTRL to selector circuit 410 to dynamically configure vector processing pipelines including some, all or none of vector processing operation circuits 408(1), 408(2), . . . , 408(N) between input queue 402 and output queue 404 to implement vector processing operations specified in the received vector processing command chains (e.g., C1, C2 and C3 in FIG. 5B) from command queue 406, with each vector processing command chain associated with a corresponding one of the input vectors (e.g., VAi, VBi and VCi, respectively).

Figure 4C:
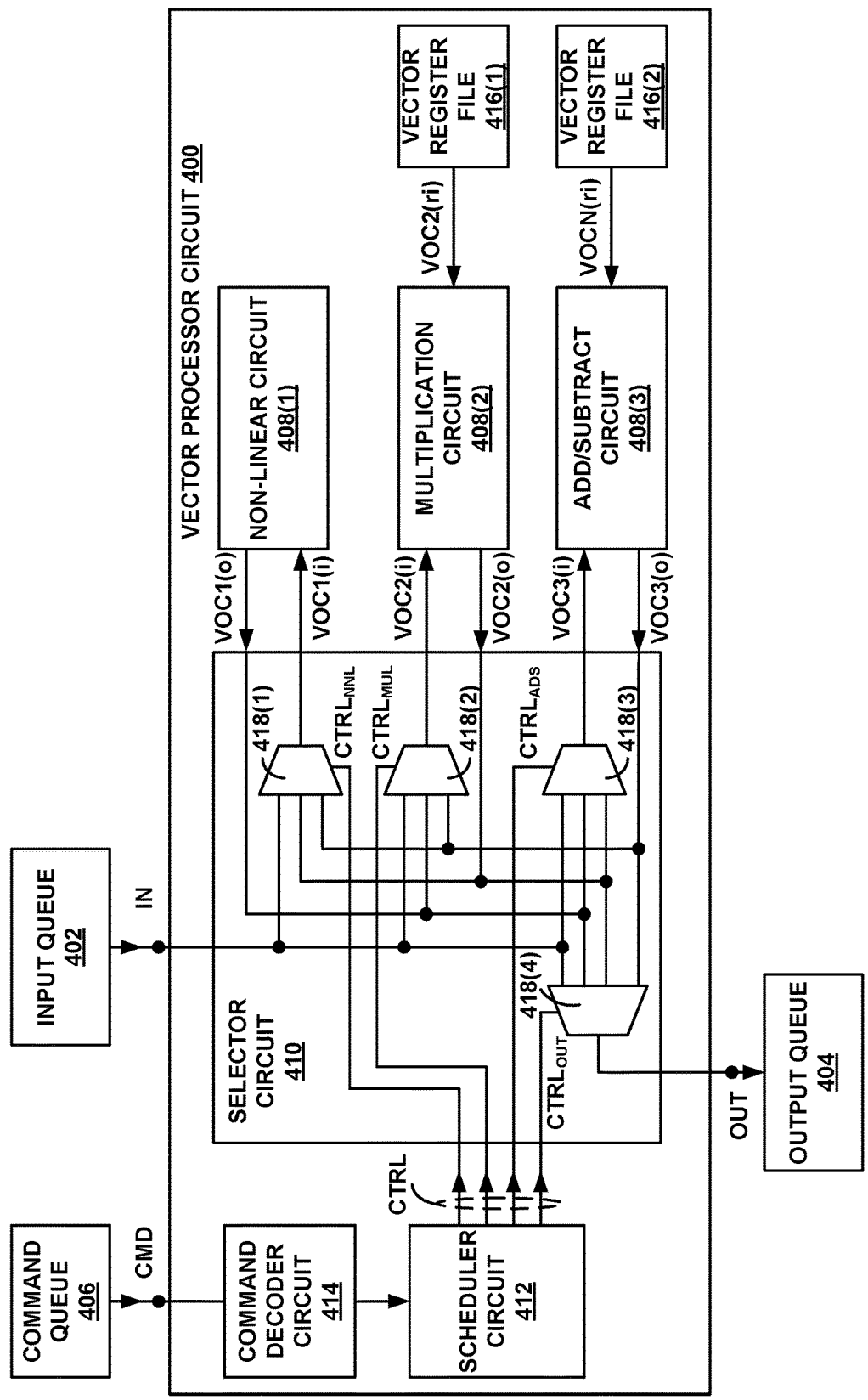

Referring now to FIG. 4C, an implementation of selector circuit 410 is described. In an implementation, selector circuit 410 includes a network of multiplexor circuits 418(1), 418(2), 418(3) and 418(4), and scheduler circuit 412 provides control signals CTRL that include control signals $CTRL_{NNL}$, $CTRL_{MUL}$, $CTRL_{ADS}$, and $CTRL_{OUT}$ to control operation of multiplexor circuits 418(1), 418(2), 418(3) and 418(4), respectively.

Each multiplexor circuit 418(1), 418(2), 418(3) and 418(4) is coupled to a corresponding one of control signals $CTRL_{NNL}$, $CTRL_{MUL}$, $CTRL_{ADS}$, and $CTRL_{OUT}$, respectively. In an implementation, each of control signals $CTRL_{NNL}$, $CTRL_{MUL}$, $CTRL_{ADS}$, and $CTRL_{OUT}$ are digital signals having binary values. In other implementations, other types of signals may be used for control signals $CTRL_{NNL}$, $CTRL_{MUL}$, $CTRL_{ADS}$, and $CTRL_{OUT}$. In other implementations, selector circuit 410 may include additional or fewer multiplexor circuits 418(1), 418(2), 418(3) and 418(4), and/or may include circuit elements in addition to or other than multiplexor circuits 418(1), 418(2), 418(3) and 418(4).

In an implementation, multiplexor circuit 418(1) includes a first input terminal coupled at input terminal IN to input queue 402, a second input terminal coupled to output terminal VOC2(O) of vector processing operation circuit 408(2), a third input terminal coupled to output terminal VOC3(O) of vector processing operation circuit 408(3), an output terminal coupled to input terminal VOC1(i) of vector processing operation circuit 408(1), and a control terminal coupled to control signal $CTRL_{NNL}$. In an implementation, based on control signal $CTRL_{NNL}$, multiplexor circuit 418(1) selectively couples one (or none) of the signals at input terminal IN, output terminal VOC2(O), and output terminal VOC3(O) to input terminal VOC1(i) of vector processing operation circuit 408(1).

In an implementation, multiplexor circuit 418(2) includes a first input terminal coupled at input terminal IN to input queue 402, a second input terminal coupled to output terminal VOC1(O) of vector processing operation circuit 408(1), a third input terminal coupled to output terminal VOC3(O) of vector processing operation circuit 408(3), an output terminal coupled to input terminal VOC2(i) of vector processing operation circuit 408(2), and a control terminal coupled to control signal $CTRL_{MUL}$. In an implementation, based on control signal $CTRL_{MUL}$, multiplexor circuit 418(2) selectively couples one (or none) of the signals at input terminal IN, output terminal VOC1(O), and output terminal VOC3(O) to input terminal VOC2(i) of vector processing operation circuit 408(2).

In an implementation, multiplexor circuit 418(3) includes a first input terminal coupled at input terminal IN to input queue 402, a second input terminal coupled to output terminal VOC1(O) of vector processing operation circuit 408(1), a third input terminal coupled to output terminal VOC2(O) of vector processing operation circuit 408(2), an output terminal coupled to input terminal VOC3(i) of vector processing operation circuit 408(3), and a control terminal coupled to control signal $CTRL_{ADS}$. In an implementation, based control signal $CTRL_{ADS}$, multiplexor circuit 418(3) selectively couples one (or none) of the signals at input terminal IN, output terminal VOC1(O), and output terminal VOC2(O) to input terminal VOC3(i) of vector processing operation circuit 408(3).

In an implementation, multiplexor circuit 418(4) includes a first input terminal coupled at input terminal IN to input queue 402, a second input terminal coupled to output terminal VOC1(O) of vector processing operation circuit 408(1), a third input terminal coupled to output terminal VOC2(O) of vector processing operation circuit 408(2), a fourth input terminal coupled to output terminal VOC3(O) of vector processing operation circuit 408(3), an output terminal coupled at output terminal OUT to output queue 404, and a control terminal coupled to control signal $CTRL_{OUT}$. In an implementation, based on control signal $CTRL_{OUT}$, multiplexor circuit 418(4) selectively couples one of the signals at input terminal IN, output terminal VOC1(O), output terminal VOC2(O), and output terminal VOC3(O) to output queue 404.

In an implementation, scheduler circuit 412 provides control signals $CTRL_{NNL}$, $CTRL_{MUL}$, $CTRL_{ADS}$ and $CTRL_{OUT}$ to selector circuit 410 to dynamically configure vector processing pipelines including some, all or none of vector processing operation circuits 408(1), 408(2), 408(3) between input queue 402 and output queue 404 to implement vector processing operations specified in the received vector processing command chains (e.g., C1, C2 and C3 in FIG. 5B) from command queue 406.

In an implementation, selector circuit 410 of FIG. 4C is capable of configuring sixteen different vector processing pipelines between input queue 402 and output queue 404, corresponding to sixteen different vector processing command chains from command queue 406, as depicted in FIGS. 6A1-6P2. In the examples depicted in FIGS. 6A1-6P2, vector processing operation circuit 408(1) is configured to perform a non-linear vector processing operation (e.g., ReLU), vector processing operation circuit 408(2) is configured to perform elementwise vector-vector multiplication, and vector processing operation circuit 408(2) is configured to perform addition/subtraction.

FIG. 6A1 depicts a vector processing command chain CA specifying that an input vector is to be retrieved from input queue 402 and stored in output queue 404 as corresponding output vector. FIG. 6A2 depicts a corresponding vector processing pipeline between input queue 402 and output queue 404. In particular, selector circuit 410 couples input queue 402 directly to output queue 404, with none of vector processing operation circuits 408(1), 408(2), or 408(3) coupled between input queue 402 and output queue 404.

FIG. 6B1 depicts a vector processing command chain CB specifying that an input vector is to be retrieved from input queue 402 and processed with a ReLU function, and the processed result is to be stored in output queue 404 as a corresponding output vector. FIG. 6B2 depicts a corresponding vector processing pipeline between input queue 402 and output queue 404. In particular, selector circuit 410 couples vector processing operation circuit 408(1) (non-linear circuit) between input queue 402 and output queue 404.

FIG. 6C1 depicts a vector processing command chain CC specifying that an input vector is to be retrieved from input queue 402 and then multiplied by a vector x, and the multiplication result is to be stored in output queue 404 as a corresponding output vector. FIG. 6C2 depicts a corresponding vector processing pipeline between input queue 402 and output queue 404. In particular, selector circuit 410 couples vector processing operation circuit 408(2) (multiplication circuit) between input queue 402 and output queue 404.

FIG. 6D1 depicts a vector processing command chain CD specifying that an input vector is to be retrieved from input queue 402 and then added to a vector x, and the summation result is to be stored in output queue 404 as a corresponding output vector. FIG. 6D2 depicts a corresponding vector processing pipeline between input queue 402 and output queue 404. In particular, selector circuit 410 couples vector processing operation circuit 408(3) (add/subtract circuit) between input queue 402 and output queue 404.

FIG. 6E1 depicts a vector processing command chain CE specifying that an input vector is to be retrieved from input queue 402 and processed with a ReLU function, the processed result is to be multiplied by a vector x, and the multiplication result is to be stored in output queue 404 as a corresponding output vector. FIG. 6E2 depicts a corresponding vector processing pipeline between input queue 402 and output queue 404. In particular, selector circuit 410 couples vector processing operation circuit 408(1) (non-linear circuit) and vector processing operation circuit 408(2) (multiplication circuit)—in that order—between input queue 402 and output queue 404.

FIG. 6F1 depicts a vector processing command chain CF specifying that an input vector is to be retrieved from input queue 402, multiplied by a vector x, the multiplication result is to be processed with a ReLU function, and the processed result is to be stored in output queue 404 as a corresponding output vector. FIG. 6F2 depicts a corresponding vector processing pipeline between input queue 402 and output queue 404. In particular, selector circuit 410 couples vector processing operation circuit 408(2) (multiplication circuit) and vector processing operation circuit 408(1) (non-linear circuit)—in that order—between input queue 402 and output queue 404.

FIG. 6G1 depicts a vector processing command chain CG specifying that an input vector is to be retrieved from input queue 402, processed with a ReLU function, and the processed result is to be added to a vector x, the summation result is to be stored in output queue 404 as a corresponding output vector. FIG. 6G2 depicts a corresponding vector processing pipeline between input queue 402 and output queue 404. In particular, selector circuit 410 couples vector processing operation circuit 408(1) (non-linear circuit) and vector processing operation circuit 408(3) (add/subtract circuit)—in that order—between input queue 402 and output queue 404.

FIG. 6H1 depicts a vector processing command chain CH specifying that an input vector is to be retrieved from input queue 402, added to a vector x, the summation result is to be processed with a ReLU function, and the processed result is to be stored in output queue 404 as a corresponding output vector. FIG. 6H2 depicts a corresponding vector processing pipeline between input queue 402 and output queue 404. In particular, selector circuit 410 couples vector processing operation circuit 408(3) (add/subtract circuit) and vector processing operation circuit 408(1) (non-linear circuit)—in that order—between input queue 402 and output queue 404.

FIG. 6I1 depicts a vector processing command chain CI specifying that an input vector is to be retrieved from input queue 402, multiplied by a vector x, the multiplication result is to be added to a vector y, and the summation result is to be stored in output queue 404 as a corresponding output vector. FIG. 6I2 depicts a corresponding vector processing pipeline between input queue 402 and output queue 404. In particular, selector circuit 410 couples vector processing operation circuit 408(2) (multiplication circuit) and vector processing operation circuit 408(3) (add/subtract circuit)—in that order—between input queue 402 and output queue 404.

FIG. 6J1 depicts a vector processing command chain CJ specifying that an input vector is to be retrieved from input queue 402, added to a vector x, the summation result is to be multiplied by a vector y, and the multiplication result is to be stored in output queue 404 as a corresponding output vector. FIG. 6J2 depicts a corresponding vector processing pipeline between input queue 402 and output queue 404. In particular, selector circuit 410 couples vector processing operation circuit 408(3) (add/subtract circuit) and vector processing operation circuit 408(2) (multiplication circuit)—in that order—between input queue 402 and output queue 404.

FIG. 6K1 depicts a vector processing command chain CK specifying that an input vector is to be retrieved from input queue 402, processed with a ReLU function, the processed result is to be multiplied by a vector x, the multiplication result is to be added to a vector y, and the summation result is to be stored in output queue 404 as a corresponding output vector. FIG. 6K2 depicts a corresponding vector processing pipeline between input queue 402 and output queue 404. In particular, selector circuit 410 couples vector processing operation circuit 408(1) (non-linear circuit), vector processing operation circuit 408(2) (multiplication circuit) and vector processing operation circuit 408(3) (add/subtract circuit)—in that order—between input queue 402 and output queue 404.

FIG. 6L1 depicts a vector processing command chain CL specifying that an input vector is to be retrieved from input queue 402, processed with a ReLU function, the processed result is to be added to a vector x, the summation result is to be multiplied by a vector y, and the multiplication result is to be stored in output queue 404 as a corresponding output vector. FIG. 6L2 depicts a corresponding vector processing pipeline between input queue 402 and output queue 404. In particular, selector circuit 410 couples vector processing operation circuit 408(1) (non-linear circuit), vector processing operation circuit 408(3) (add/subtract circuit) and vector processing operation circuit 408(2) (multiplication circuit)—in that order—between input queue 402 and output queue 404.

FIG. 6M1 depicts a vector processing command chain CM specifying that an input vector is to be retrieved from input queue 402, multiplied by a vector x, the multiplication result is to be processed with a ReLU function, the processed result is to be added to a vector y, and the summation result is to be stored in output queue 404 as a corresponding output vector. FIG. 6M2 depicts a corresponding vector processing pipeline between input queue 402 and output queue 404. In particular, selector circuit 410 couples vector processing operation circuit 408(2) (multiplication circuit), vector processing operation circuit 408(1) (non-linear circuit), and vector processing operation circuit 408(3) (add/subtract circuit)—in that order—between input queue 402 and output queue 404.

FIG. 6N1 depicts a vector processing command chain CN specifying that an input vector is to be retrieved from input queue 402, multiplied by a vector x, the multiplication result is to be added to a vector y, the summation result is to be processed with a ReLU function, and the processed result is to be stored in output queue 404 as a corresponding output vector. FIG. 6N2 depicts a corresponding vector processing pipeline between input queue 402 and output queue 404. In particular, selector circuit 410 couples vector processing operation circuit 408(2) (multiplication circuit), vector processing operation circuit 408(3) (add/subtract circuit), and vector processing operation circuit 408(1) (non-linear circuit)—in that order—between input queue 402 and output queue 404.

FIG. 6O1 depicts a vector processing command chain CO specifying that an input vector is to be retrieved from input queue 402, added to a vector x, the summation result is to be processed with a ReLU function, the processed result is to be multiplied by a vector y, and the multiplication result is to be stored in output queue 404 as a corresponding output vector. FIG. 6O2 depicts a corresponding vector processing pipeline between input queue 402 and output queue 404. In particular, selector circuit 410 couples vector processing operation circuit 408(3) (add/subtract circuit), vector processing operation circuit 408(1) (non-linear circuit), and vector processing operation circuit 408(2) (multiplication circuit)—in that order—between input queue 402 and output queue 404.

FIG. 6P1 depicts a vector processing command chain CP specifying that an input vector is to be retrieved from input queue 402, added to a vector x, the summation result is to be multiplied by a vector y, the multiplication result is to be processed with a ReLU function, and the processed result is to be stored in output queue 404 as a corresponding output vector. FIG. 6P2 depicts a corresponding vector processing pipeline between input queue 402 and output queue 404. In particular, selector circuit 410 couples vector processing operation circuit 408(3) (add/subtract circuit), vector processing operation circuit 408(2) (multiplication circuit), and vector processing operation circuit 408(1) (non-linear circuit)—in that order—between input queue 402 and output queue 404.

Referring again to FIG. 4A, scheduler circuit 412 is coupled via command decoder circuit 414 to command queue 406, which stores vector processing command chains (e.g., C1, C2 and C3 in FIG. 5B), with each vector processing command chain associated with a corresponding input vector (e.g., VAi, VBi and VCi in FIG. 5A) stored in input queue 402. Scheduler circuit 412 provides control signals CTRL to selector circuit 410 to dynamically configure vector processing pipelines including some, all or none of vector processing operation circuits 408(1), 408(2), ..., 408(N) between input queue 402 and output queue 404 to implement vector processing operations specified in the received vector processing command chains from command queue 406.

In an implementation, each vector processing command chain (e.g., C1, C2 and C3 in FIG. 5B) specifies vector processing operations to be performed on an associated corresponding input vector (e.g., VAi, VBi and VCi, respectively) to produce an associated corresponding output vector (e.g., VAo, VBo and VCo, respectively). In an implementation, the vector processing command chains do not include scheduling information for dynamically configuring the vector processing pipelines to process successive vector processing command chains. In an implementation, scheduler circuit 412 determines such scheduling information, which is provided to selector circuit 410 via control signals CTRL.

In an implementation, as command queue 406 receives each vector processing command chain, scheduler circuit 412 schedules operation of each received vector processing command chain in vector processor circuit 400.

In an implementation, scheduler circuit 412 provides control signals CTRL to schedule operation of successive vector processing command chains in vector processor circuit 400.

In an implementation, scheduler circuit 412 schedules successive vector processing command chains in vector processor circuit 400 to maximize throughput through vector processor circuit 400.

In an implementation, scheduler circuit 412 determines such scheduling in real-time as vector processing command chains are received by command queue 406.

Figure 7:
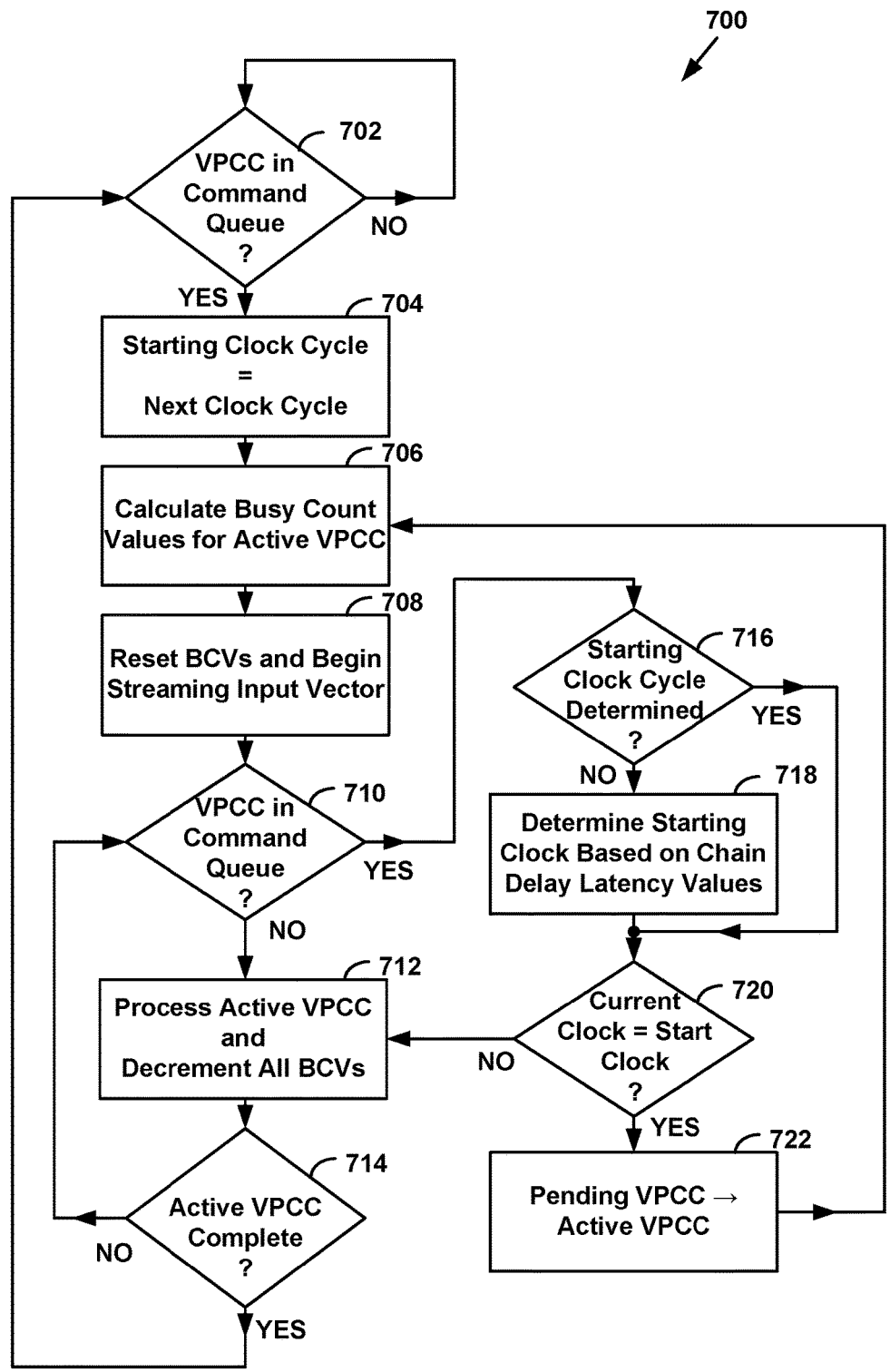
FIG. 7 is a flowchart that shows one manner of operation of the example vector processor circuits of FIGS. 4A-4C.

FIG. 7 is a flowchart of an implementation of a process 700 for scheduling vector processing command chains in vector processor circuit 400 to processes associated corresponding input vectors. In an implementation, scheduler circuit 412 implements process 700, although in other implementations, some other circuit or combination of circuits may implement process 700.

As described in more detail below, in an implementation, scheduler circuit 412 implements process 700 to simultaneously schedule successive vector processing command chains in vector processor circuit 400 to maximize throughput while avoiding structural hazards in vector processor circuit 400. In an implementation, scheduler circuit 412 determines such scheduling in real time based on the vector processing operations specified in the vector processing command chains. In an implementation, the vector processing command chains do not include scheduling information.

To facilitate understanding, examples of the operation of process 700 will be described using vector processor circuit 400 of FIG. 4C, and input queue 402, command queue 406 and output queue 404 of FIGS. 5A, 5B and 5C, respectively.

At step 702, a determination is made whether command queue 406 includes a vector processing command chain. In an implementation, command decoder circuit 414 provides an alert (e.g., sets a flag, generates an interrupt, etc.) to inform scheduler circuit 412 that a vector processing command chain (e.g., vector processing command chain C1) has been received in command queue 406. In an implementation, prior to receiving an indication at step 702, vector processor circuit is in an "idle" state—e.g., not currently processing any vector processing command chains or corresponding input vectors.

To simplify the following description, the first vector processing command chain received in command queue 406 while vector processor circuit is in an idle state will be referred to herein as the "first vector processing command chain." If command queue 406 does not include a first vector processing command chain, process 700 loops back to step 702.

If command queue 406 includes a first vector processing command chain, at step 704 a starting clock cycle corresponding to the first vector processing command chain is specified as the next clock cycle. For simplicity, in the following description, the starting clock cycle for the first vector processing command chain is described as "clock cycle 1." For example, vector processing command chain C1 is the first vector processing command chain received in command queue 406, so at step 704 scheduler circuit 412 determines that the starting clock cycle corresponding to first vector processing command chain C1 is clock cycle 1.

At step 706, "busy count" values are calculated for each structure used to implement the vector processing command chain currently being processed (referred to as the "active vector processing command chain"). In an implementation, a busy count value specifies the number of clock cycles that each structure will be "busy" (e.g., in use) while vector processor circuit 400 executes the active vector processing command chain. In an implementation, scheduler circuit 412 receives from command decoder circuit 414 "chain delay latency values," described in more detail below, for each structure used to process the active command chain, and determines busy count values based on the received chain delay latency values.

Referring to FIG. 4A, each vector processing operation implemented by a corresponding one of vector processing operation circuits 408(1), 408(2), ..., 408(N) has an associated vector processing operation circuit latency (referred to in the remaining description as a "latency") which is a number of clock cycles required to complete the vector processing operation performed by the vector processing operation circuit.

For example, Table 1, below, lists example latencies for various vector processing operations described above.

TABLE 1

Example Latency Values

| Vector Processing Operation | Latency (clock cycles) |
|---|---|
| Non-Linear (e.g., sigmoid, hyperbolic tangent, ReLU) | 3 |
| Multiplication | 7 |
| Add/Subtract | 10 |

The values listed in Table 1 are for illustrative purposes only. Other vector processing operation circuit latency values may be used.

In an implementation, command decoder circuit 402 is configured to receive vector processing command chains from command queue 406, and determine for each received command chain, a chain delay latency value for each structure used to process the received command chain.

In an implementation, a chain delay latency value for a structure specifies the number of clock cycles that elapse before the first sub-segment of vector data arrives at the structure. Stated another way, a chain delay latency value (CDLV)(i) for a structure may be expressed as:

$$CDLV(i)=CDLV(i-1)+LAT(i-1) \qquad (1)$$

where CDLV(i−1) is the chain delay latency value for the immediately preceding structure in the vector processing command chain, and LAT(i−1) is the latency of the immediately preceding structure in the vector processing command chain.

Using the example vector processing circuit 400 of FIG. 4C, the structures include input queue 402, output queue 406, and any vector processing operation circuit 408(1), 408(2), 408(3) that will be used to implement the vector processing operations specified in the received command chain. In an implementation, command decoder circuit 402 determines chain delay latency values based on specified latency values for each vector processing operation, such as the latency values specified in Table 1, above.

FIG. 8 lists chain delay latency values for each structure in FIG. 4C used to process the example vector processing command chains C1, C2 and C3 of FIG. 5B, using the example latencies listed in Table 1, described above, with input queue 402 and output queue 404 each having zero (0) latency. In the diagram, INQ represents input queue 402, NL represents a non-linear vector processing operation (e.g., sigmoid, hyperbolic tangent, ReLU), MUL represents an elementwise vector-vector multiplication vector processing operation, A/S represents a vector-vector addition/subtraction vector processing operation, and OUTQ represents output queue 404.

Vector processing command chain C1 specifies that input vector VAi is to be retrieved from input queue 402 and then multiplied by a vector w, the multiplication result is to be added to a vector x, and the summation result is to be stored in output queue 404 as corresponding output vector VAo. Input vector VAi originates at input queue 402, so CDLV (i−1)=LAT (i−1)=0, and from Equation (1) the chain delay latency for INQ=0. The chain delay latency for NL is not determined because vector processing command chain C1 does not specify a non-linear vector processing operation. For MUL, the immediately preceding structure in the vector processing command chain (INQ) has a chain delay latency value of zero (CDLV(i−1)=0) and has zero latency (LAT(i−1)=0), and thus from Equation (1) the chain delay latency value for MUL=0. For A/S, the immediately preceding structure in the vector processing command chain (MUL) has a chain delay latency value of zero (CDLV(i−1)=0) and has a latency of seven (LAT(i−1)=7), and thus from Equation (1) the chain delay latency value for A/S=7. For OUTQ, the immediately preceding structure in the vector processing command chain (A/S) has a chain delay latency value of seven (CDLV(i−1)=7) and has a latency of ten (LAT(i−1)=10), and thus from Equation (1) the chain delay latency value for OUTQ=17.

Vector processing command chain C2 specifies that input vector VBi is to be retrieved from input queue 402 and then added to a vector y, the summation result is to be multiplied by a vector z, and the multiplication result is to be stored in output queue 404 as corresponding output vector VBo. Input vector VBi originates at input queue 402, so CDLV(i−1)= LAT (i−1)=0, and from Equation (1) the chain delay latency for INQ=0. The chain delay latency for NL is not determined because vector processing command chain C2 does not specify a non-linear vector processing operation. For A/S, the immediately preceding structure in the vector processing command chain (INQ) has a chain delay latency value of zero (CDLV(i−1)=0) and has zero latency (LAT(i−1)=0), and thus from Equation (1) the chain delay latency value for A/S=0. For MUL, the immediately preceding structure in the vector processing command chain (A/S) has a chain delay latency value of zero (CDLV(i−1)=0) and has a latency often (LAT(i−1)=10), and thus from Equation (1) the chain delay latency value for MUL=10. For OUTQ, the immediately preceding structure in the vector processing command chain (MUL) has a chain delay latency value often (CDLV(i−1)= 10) and has a latency of seven (LAT(i−1)=7), and thus from Equation (1) the chain delay latency value for OUTQ=17.

Vector processing command chain C3 specifies vector processing operations to be performed on corresponding input vector VCi to produce corresponding output vector VCo. In an implementation, vector processing command chain C3 specifies that input vector VCi is to be retrieved from input queue 402 and processed with a hyperbolic tangent function, and the processed result is to be stored in output queue 404 as corresponding output vector VCo. Input vector VCi originates at input queue 402, so CDLV(i−1)= LAT (i−1)=0, and from Equation (1) the chain delay latency for INQ=0. For NL, the immediately preceding structure in the vector processing command chain (INQ) has a chain delay latency value of zero (CDLV(i−1)=0) and has zero latency (LAT(i−1)=0), and thus from Equation (1) the chain delay latency value for NL=0. The chain delay latencies for MUL and A/S are not determined because vector processing command chain C2 does not specify multiplication or addition/subtraction vector processing operations. For OUTQ, the immediately preceding structure in the vector processing command chain (NL) has a chain delay latency value of zero (CDLV(i−1)=0) and has a latency of three (LAT(i−1)=3), and thus from Equation (1), the chain delay latency value for OUTQ=3.

Referring again to FIG. 7, at step 706 a busy count value is calculated for each structure used in the active vector processing command chain. In an implementation, the busy count value for a structure being is determined by the following equation:

$$busy\_count=CDLV+Vseg-1 \qquad (2)$$

where CDLV is the chain delay latency value for the structure, and Vseg is the number of vector sub-segments that comprise a complete vector. For example, if a vector includes 100 elements, and vector processor circuit 400 processes 10 elements in parallel at a time, Vseg=10. For any structures not being used in a vector processing command chain, the busy counts for those structures are ignored.

By way of example, for active vector processing command chain C1, no non-linear vector processing operation is performed, and thus the busy count value for NL=0. Selector circuit 410 initializes the busy count values for INQ, MUL, A/S, and OUTQ. For example, using Equation (2), above, the busy count values for INQ, MUL, A/S, and OUTQ are calculated as:

| Structure | Busy Count (CDLV + Vseg − 1) |
|---|---|
| INQ | 0 + 10 − 1 = 9 |
| MUL | 0 + 10 − 1 = 9 |
| A/S | 7 + 10 − 1 = 16 |
| OUTQ | 17 + 10 − 1 = 26 |

At step 708, scheduler circuit 412 resets any previously determined busy count values to the busy count values calculated in step 706, and provides control signals CTRL to selector circuit 410 to begin streaming the input vector corresponding to the active vector processing command chain from input queue 402 to one of vector processing operation circuits 408(1), 408(2), . . . , 408(N) or output queue 404.

For example, for active vector processing command chain C1, scheduler circuit 412 provides control signals CTRL to selector circuit 410 to begin streaming corresponding input vector VAi from input queue 402 to multiplication circuit 408(2), and resets the busy count values to the busy count values calculated in step 706.

FIG. 9 illustrates example busy count values for active vector processing command chain C1, using the example chain delay latency values listed in FIG. 8, and with Vseg=10. As described above, the starting clock cycle corresponding to vector processing command chain C1 is clock cycle 1, highlighted with an arrow in FIG. 9.

At clock cycle 1, selector circuit 410 calculates busy count values for each structure (INQ, NL, MUL, A/S, OUTQ) using Equation (2), resets any previously determined busy count values to the calculated busy count values and provides control signals CTRL to selector circuit 410 to begin streaming input vector VAi from input queue 402 to multiplication circuit 408(2), Vseg=10 elements at a time for each clock cycle.

Thus, at clock cycle 1, the busy count values indicate that input queue 402 will be busy for 9 more clock cycles (streaming input vector VAi ten elements at a time), multiplication circuit 408(2) will be busy for 9 more clock cycles (processing input vector VAi ten elements at a time), add/subtract circuit 408(3) will be busy for 16 more clock cycles (processing the output of multiplication circuit 408(2)), and output queue 404 will be busy for 26 more clock cycles (receiving output of add/subtract circuit 408(3)).

Referring again to FIG. 7, at step 710 a determination is made whether command queue 406 includes a vector processing command chain that is awaiting execution by vector processor circuit 400. As used herein, such a vector processing command chain is referred to as a "pending vector processing command chain." If command queue 406 contains no pending vector processing command chains, at step 712 scheduler circuit 412 provides control signals to selector circuit 410 to process the next clock cycle of the active vector processing command chain, and scheduler circuit 412 decrements all busy count values by one.

At step 714, a determination is made whether vector processor circuit 400 has completed processing the active vector processing command chain. If the active vector processing command chain has not completed processing, process 700 returns to step 710 to determine whether command queue 406 includes a pending vector processing command chain. Alternatively, if the active vector processing command chain has completed processing, process 700 returns to step 702 to await receipt of a vector processing command chain in command queue 406.

Referring again to step 710, using the example of FIG. 5B, command queue 406 includes a pending vector processing command chain C2, and thus process 700 proceeds to step 716 to determine whether a starting clock cycle corresponding to the pending vector processing command chain has previously been determined.

If a starting clock cycle corresponding to the pending vector processing command chain has not previously been determined, at step 718 a starting clock cycle corresponding to the pending vector processing command chain is determined. In an implementation, the determined starting clock cycle is a first clock cycle when all structural hazards in vector processor circuit 400 are avoided—that is, when vector processor circuit 400 begins processing an input vector associated with the corresponding vector processing command chain, all structural hazards will have resolved by the time the input vector reaches the input of each structure in vector processor circuit 400.

In an implementation, scheduler circuit 412 determines that the starting clock cycle corresponding to the pending vector processing command chain is equal to the next clock cycle after the following condition is satisfied:

$$\text{busy\_count} \le \text{CDLV} \qquad (3)$$

for all structures, where CDLV is the chain delay latency value for a structure in the pending vector processing command chain.

For example, for pending vector processing command chain C2, using the example chain delay latency values in FIG. 8, INQ, MUL, A/S and OUTQ have the following CDLV values: 0, 10, 0 and 17, respectively. In FIG. 9, at clock cycle 1, busy count values for INQ, MUL, A/S and OUTQ are 9, 9, 16 and 26, respectively. For INQ, the busy count will be less than or equal to CDLV (0) after nine additional clock cycles (i.e., until clock cycle 10). For MUL, the busy count will be less than or equal to CDLV (10) at clock cycle 1. For A/S, the busy count will be less than or equal to CDLV (0) after 16 additional clock cycles (i.e., until clock cycle 17). For OUTQ, the busy count will be less than or equal to CDLV (17) after nine additional clock cycles (i.e., until clock cycle 10).

Thus, in this example, Equation (3) is satisfied for pending vector processing command chain C2 at clock cycle 17. Accordingly, at step 718 in FIG. 7, scheduler circuit 412 determines that the starting clock cycle corresponding to pending vector processing command chain C2 is clock cycle 18 (i.e., the next clock cycle after clock cycle 17) (highlighted in FIG. 8 with an arrow). At clock cycle 18, all structural hazards will have resolved by the time the input vector reaches the input of each structure in vector processor circuit 400.

At step 720, a determination is made whether the current clock cycle is equal to the starting clock cycle corresponding to the pending vector processing command chain. If the current clock cycle is not equal to the starting clock cycle corresponding to the pending vector processing command chain, process 700 proceeds to step 712, and scheduler circuit provides control signals CTRL to selector circuit 410 to processes the next clock cycle of the active vector processing command chain.

For example, referring to FIG. 9, if the current clock cycle is clock cycle 2 (which is not equal to the starting clock cycle (18) for pending vector processing command chain C2), process 700 proceeds to step 712 and scheduler circuit 412 provides control signals CTRL to selector circuit 410 to process the next clock cycle (e.g., clock cycle 3) of active vector processing command chain C1, and decrements all busy count values by one.

Referring again to FIG. 7, process 700 continues looping through steps 710, 716, 718, 720, 712 and 714 until at step 720 the current clock cycle equals the starting clock cycle corresponding to the pending vector processing command chain.

Thus, in the example depicted in FIG. 9, from clock cycles 2-10, scheduler circuit 412 provides control signals CTRL to selector circuit 410 to continue streaming input vector VAi ten elements at a time from input queue 402 to multiplication circuit 408(2), and from clock cycles 11 through 17, scheduler circuit 412 provides control signals CTRL to selector circuit 410 to continue processing active vector processing command chain C1.

At clock cycle 17, the busy count values for INQ, NL, MUL and A/S structures are all 0, which means that those structures are "available" to process a pending vector processing command chain. The busy count value for OUTQ is 10, which means that scheduler circuit 412 will provide control signals CTRL to selector circuit 410 to continue processing active vector processing command chain C1 through output queue 404 for ten more clock cycles (e.g., until clock cycle 27).

However, even though at clock cycle 17 vector processor circuit 400 has not fully completed processing active vector processing command chain C1, vector processor circuit 400 can begin processing pending vector processing command chain C2 on the next clock cycle 18 (the starting clock cycle corresponding to pending vector processing command chain C2) because the starting clock cycle specifies the clock cycle at which no structural hazards exist, and scheduler circuit 412 can provide control signals CTRL to selector circuit 410 to begin processing the pending vector processing command chain.

Referring again to FIG. 7, at step 720 a determination is made whether the current clock cycle is equal to the starting clock cycle corresponding to the pending vector processing command chain. Continuing with the example of FIG. 9, at clock cycle 18, the current clock cycle equals the starting clock cycle corresponding to pending vector processing command chain C2.

Accordingly, at step 722 the pending vector processing command chain becomes the active vector processing command chain. Thus, continuing with the example described above, pending vector processing command chain C2 becomes the active vector processing command chain. Process 700 loops back to step 706 to calculate a busy count value for each structure used in the active vector processing command chain.

In active vector processing command chain C2, no non-linear vector processing operation is performed, and thus the busy count for NL=0. Selector circuit 410 calculates the busy counts for INQ, MUL, A/S, and OUTQ. For example, using Equation (2), above, the busy counts for INQ, MUL, A/S, and OUTQ are calculated as:

| Structure | Busy Count (CDLV + Vseg − 1) |
|---|---|
| INQ | 0 + 10 − 1 = 9 |
| MUL | 10 + 10 − 1 = 19 |
| A/S | 0 + 10 − 1 = 9 |
| OUTQ | 17 + 10 − 1 = 26 |

That is, the busy counts indicate that input queue 402 will be busy for 9 more clock cycles (streaming input vector VBi ten elements at a time), add/subtract circuit 408(3) will be busy for 9 more clock cycles (processing input vector VBi ten elements at a time), multiplication circuit 408(2) will be busy for 19 more clock cycles (processing the output of add/subtract circuit 408(3)), and output queue 404 will be busy for 26 more clock cycles (receiving output of multiplication circuit 408(2)).

At step 708, scheduler circuit 412 resets any previously determined busy count values to the busy count values calculated in step 706, and provides control signals CTRL to selector circuit 410 to begin streaming the input vector corresponding to the active vector processing command chain from input queue 402 to one of vector processing operation circuits 408(1), 408(2), . . . , 408(N) or output queue 404.

For example, for active vector processing command chain C2, scheduler circuit 412 provides control signals CTRL to selector circuit 410 to begin streaming corresponding input vector VBi from input queue 402 to add/subtract circuit 408(3), and resets the busy count values to the busy count values calculated in step 706. Referring again to FIG. 9, at clock cycle 18 all busy counts have been reset accordingly.

From clock cycles 18 through 27, scheduler circuit 412 provides control signals CTRL to selector circuit 410 to stream input vector VBi from input queue 402 to add/subtract circuit 408(3) ten elements at a time, while also streaming the output of add/subtract circuit 408(3) to output queue 404 to complete processing of vector processor command chain C1.

Thus, in this example, scheduler circuit 412 simultaneously schedules successive vector processing command chains C1 and C2 in vector processor circuit 400 to maximize throughput while avoiding structural hazards in vector processor circuit 400. On clock cycle 28, scheduler circuit 412 provides control signals CTRL to selector circuit 410 to stream the outputs of add/subtract circuit 408(3) to multiplication circuit 408(2) to continue processing active vector processor command chain C2.

Referring again to FIG. 7, at step 710 a determination is made whether command queue 406 includes a vector processing command chain awaiting execution by vector processor circuit 400. In the example of FIG. 5B, vector processing command chain C3 is in command queue 406 awaiting execution by vector processor circuit 400. Thus, vector processing command chain C3 is now the pending vector processing command chain.

Referring again to FIG. 7, at step 716 a determination is made whether a starting clock cycle corresponding to the pending vector processing command chain has previously been determined. For example, because a clock cycle corresponding to pending vector processing command chain C3 has not yet been determined, at step 718 a starting clock cycle corresponding to pending vector processing command chain C3 is determined. In an implementation, scheduler circuit 412 determines that the starting clock cycle corresponding to the pending vector processing command chain is equal to the next clock cycle after the condition in Equation (3), above, is satisfied.

For example, for pending vector processing command chain C3, using the example chain delay latency values in FIG. 8, INQ, NL, and OUTQ have the following CDLV values: 0, 0 and 3, respectively (MUL and A/S are not used in vector processing command chain C3). In FIG. 9, at clock cycle 18, busy count values for INQ, NL and OUTQ are 9, 0 and 26, respectively. For INQ, the busy count will be less than or equal to CDLV (0) after nine additional clock cycles (i.e., until clock cycle 27). For OUTQ, the busy count will be less than or equal to CDLV (3) after twenty-three additional clock cycles (i.e., until clock cycle 40). Thus, Equation (3) is satisfied for pending vector processing command chain C3 at clock cycle 41. Accordingly, at step 718 in FIG. 7, scheduler circuit 412 determines that the starting clock cycle corresponding to pending vector processing command chain C3 is clock cycle 52 (i.e., the next clock cycle after clock cycle 41) (highlighted in FIG. 8 with an arrow).

At step 720, a determination is made whether the current clock cycle is equal to the starting clock cycle corresponding to the pending vector processing command chain. If the current clock cycle is not equal to the starting clock cycle corresponding to the pending vector processing command chain, process 700 proceeds to step 712, and scheduler circuit provides control signals CTRL to selector circuit 410 to processes the next clock cycle of the active vector processing command chain.

For example, referring to FIG. 9, if the current clock cycle is clock cycle 19, scheduler circuit 412 provides control signals CTRL to selector circuit 410 to process the next clock cycle (e.g., clock cycle 20) of active vector processing command chain C2, and decrements all busy count values by one.

Process 700 continues looping through steps 710, 716, 718, 720, 712 and 714 until at step 720 the current clock cycle equals the starting clock cycle corresponding to the pending vector processing command chain.

Thus, in the example depicted in FIG. 9, from clock cycles 19-27, scheduler circuit 412 provides control signals CTRL to selector circuit 410 to continue streaming input vector VBi ten elements at a time from input queue 402 to add/subtract circuit 408(3), and from clock cycles 28 through 41, scheduler circuit 412 provides control signals CTRL to selector circuit 410 to continue processing active vector processing command chain C2.

At clock cycle 40, the busy count values for INQ, NL, MUL and A/S structures are all 0, which means that those structures are "available" to process a pending vector processing command chain. The busy count value for OUTQ is 3, which means that scheduler circuit 412 will provide control signals CTRL to selector circuit 410 to continue processing active vector processing command chain C2 through output queue 404 for three more clock cycles (e.g., until clock cycle 43).

However, even though at clock cycle 40 vector processor circuit 400 has not fully completed processing active vector processing command chain C2, vector processor circuit 400 can begin processing pending vector processing command chain C3 on the next clock cycle 41 (the starting clock cycle corresponding to pending vector processing command chain C3) because the starting clock cycle specifies the clock cycle at which no structural hazards exist, and scheduler circuit 412 can provide control signals CTRL to selector circuit 410 to begin processing the pending vector processing command chain.

Referring again to FIG. 7, at step 720 a determination is made whether the current clock cycle is equal to the starting clock cycle corresponding to the pending vector processing command chain. Continuing with the example of FIG. 9, at clock cycle 41, the current clock cycle equals the starting clock cycle corresponding to pending vector processing command chain C3.

Accordingly, at step 722 the pending vector processing command chain becomes the active vector processing command chain. Thus, continuing with the example described above, pending vector processing command chain C3 becomes the active vector processing command chain. Process 700 loops back to step 706 to calculate a busy count value for each structure used in the active vector processing command chain.

In corresponding vector processing command chain C3, no multiplication or add/subtract processing operations are performed, and thus the busy count for MUL=A/S=0. Selector circuit 410 updates the busy counts for INQ, NL, and OUTQ. For example, using Equation (2), above, the busy counts for INQ, NL, and OUTQ are updated as:

| Structure | Updated Busy Count (CDLV + Vseg − 1) |
| --- | --- |
| INQ | 0 + 10 − 1 = 9 |
| NL | 0 + 10 − 1 = 9 |
| OUTQ | 3 + 10 − 1 = 12 |

That is, the busy counts indicate that input queue 402 will be busy for 9 more clock cycles (streaming input vector VCi ten elements at a time), non-linear circuit 408(1) will be busy for 9 more clock cycles (processing input vector VCi ten elements at a time), and output queue 404 will be busy for 12 more clock cycles (receiving output of non-linear circuit 408(1).

At step 708, scheduler circuit 412 resets any previously determined busy count values to the busy count values calculated in step 706, and provides control signals CTRL to selector circuit 410 to begin streaming the input vector corresponding to the active vector processing command chain from input queue 402 to one of vector processing operation circuits 408(1), 408(2), . . . , 408(N) or output queue 404.

For example, for active vector processing command chain C3, scheduler circuit 412 provides control signals CTRL to selector circuit 410 to begin streaming corresponding input vector VCi from input queue 402 to non-linear circuit 408(1), and resets the busy count values to the busy count values calculated in step 706. Referring again to FIG. 9, at clock cycle 41 all busy counts have been reset accordingly.

From clock cycles 42 through 43, scheduler circuit 412 provides control signals CTRL to selector circuit 410 to stream input vector VCi from input queue 402 to non-linear circuit 408(1) ten elements at a time, while also streaming the output of multiplication circuit 408(2) to output queue 404 to complete processing of vector processor command chain C2.

Thus, in this example, scheduler circuit 412 simultaneously schedules successive vector processing command chains C2 and C3 in vector processor circuit 400 to maximize throughput while avoiding structural hazards in vector processor circuit 400. From clock cycles 41 to 43, scheduler circuit 412 provides control signals CTRL to selector circuit 410 to stream the outputs of multiplication circuit 408(2) to multiplication circuit 408(2) to continue processing active vector processor command chain C2.

Referring again to FIG. 7, at step 710 a determination is made whether command queue 406 includes a vector processing command chain awaiting execution by vector processor circuit 400. In the example of FIG. 5B, command queue 406 includes no vector processing command chain awaiting execution by vector processor circuit 400. Thus, referring again to FIG. 7, process 700 repeats steps 712, 714 and 710 while scheduler circuit 412 provides control signals CTRL to selector circuit 410 to complete processing active vector processing command chain C3.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "might" or "may," unless specifically stated otherwise, are used to indicate that certain examples include, while other examples do not include, the noted features, elements and/or steps. Thus, unless otherwise stated, such conditional language is not intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc., may be either X, or Y, or Z, or a combination thereof.

Many variations and modifications may be made to the above-described examples, the elements of which are to be understood as being among other acceptable examples. All such modifications and variations are intended to be included herein within the scope of this disclosure.

Illustrative Aspects of the Technology

The following summary provides a non-exhaustive list of illustrative aspects of the technology set forth herein.

According to a first aspect, a processor circuit is provided that includes an input terminal and an output terminal, a plurality of vector processor operation circuits, a selector circuit coupled to the input terminal, the output terminal, and each of the vector processor operation circuits, and a scheduler circuit adapted to control the selector circuit to configure a vector processing pipeline comprising zero, one or more of the vector processor operation circuits in any order between the input terminal and the output terminal.

According to a second aspect, the scheduler circuit is adapted to determine in real time a schedule for controlling the selector circuit to configure the vector processing pipeline.

According to a third aspect, the scheduler circuit is adapted to receive a vector processing command chain that specifies vector processing operations to be performed by the vector processing pipeline, and determine from the received vector processing command chain a schedule for controlling the selector circuit to configure the vector processing pipeline, wherein the received vector processing command chain does not include scheduling information for configuring the vector processing pipeline.

According to a fourth aspect, the scheduler circuit is adapted to receive a plurality of vector processing command chains that each specify vector processing operations to be performed by corresponding vector processing pipelines, and determine in real time from the received vector processing command chains a schedule for controlling the selector circuit to simultaneously schedule successive vector processing command chains to maximize throughput while avoiding structural hazards in the processor circuit.

According to a fifth aspect, the selector circuit includes a plurality of multiplexor circuits coupled to the plurality of vector processor operation circuits, wherein the multiplexor circuits are adapted to selectively configure the vector processing pipeline.

According to a sixth aspect, each multiplexor circuit includes a control terminal coupled to receive a corresponding control signal from the scheduler circuit.

According to a seventh aspect, the plurality of vector processor operation circuits include one or more of an element-wise vector multiplication circuit, a vector addition/subtraction circuit, and a vector non-linear processing circuit.

According to an eighth aspect, each of the plurality of vector processor operation circuits include any of floating point, block floating point, and integer fixed point processor circuits.

According to a ninth aspect, the processor circuit further includes a vector register file coupled to one of the vector processor operation circuits.

According to a tenth aspect, the plurality of vector processing pipelines include machine learning algorithms.

According to an eleventh aspect, the processor circuit is implemented in a hardware accelerator circuit.

According to a twelfth aspect, the processor circuit is implemented in one or more of a field programmable gate array device, an application-specific integrated circuit device, a graphics processing unit, a massively parallel processor array device, an application-specific standard product device, a system-on-a-chip device, a complex programmable logic device, and a custom integrated circuit.

According to a thirteenth aspect, a computing device is provided that includes a hardware accelerator including hardware logic circuitry configured to perform a plurality of vector processing operations on input vectors. The hardware accelerator includes a vector processor including hardware logic circuitry configured to provide a plurality of vector processor operation circuits, and a scheduler including hardware logic circuitry configured to selectively configure a plurality of vector processing pipelines including zero, one or more of the vector processor operation circuits in any order, each vector processing pipeline associated with a corresponding one of the input vectors.

According to a fourteenth aspect, the scheduler further includes hardware logic circuitry configured to determine in real time a schedule for configuring the vector processing pipeline.

According to a fifteenth aspect, the scheduler further includes hardware logic circuitry configured to receive a vector processing command chain that specifies vector processing operations to be performed by the vector processing pipeline, and determine from the received vector processing command chain a schedule for configuring the vector processing pipeline, wherein the received vector processing command chain does not include scheduling information for configuring the vector processing pipeline.

According to a sixteenth aspect, the scheduler further includes hardware logic circuitry configured to determine the schedule in real time.

According to a seventeenth aspect, the plurality of vector processor operation circuits include one or more of an element-wise vector multiplication circuit, a vector addition/subtraction circuit, and a vector non-linear processing circuit.

According to an eighteenth aspect, the plurality of vector processing pipelines include machine learning algorithms.

According to a nineteenth aspect, a method is provided that includes using hardware logic circuitry to perform a plurality of vector processing operations on input vectors. The hardware logic circuitry includes a vector processor including hardware logic circuitry configured to provide a plurality of vector processor operation circuits, and a scheduler including hardware logic circuitry configured to selectively configure a plurality of vector processing pipelines including zero, one or more of the vector processor operation circuits in any order, each vector processing pipeline associated with a corresponding one of the input vectors.

According to a twentieth aspect, the method further includes implementing the hardware logic circuitry on one or more of a field programmable gate array device, an application-specific integrated circuit device, a graphics processing unit device, a massively parallel processor array device, an application-specific standard product device, a system-on-a-chip device, a complex programmable logic device, and a custom integrated circuit.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A processor circuit comprising:
   an input terminal and an output terminal;
   a plurality of vector processor operation circuits;
   a selector circuit coupled to the input terminal, the output terminal, and each of the vector processor operation circuits; and
   a scheduler circuit performing steps comprising:
      calculating a chain delay latency value for each vector processor operation circuit utilized by a first vector processing command chain, wherein a chain delay latency value for a vector processor operation circuit indicates a quantity of clock cycles that elapse before a first sub-segment of a first vector data associated with the first vector processing command chain arrives at the vector processor operation circuit;
      generating a busy count value for the each vector processor operation circuit utilized by the first vector processing command chain, the busy count value being based on both: (1) the calculated chain delay latency value for the each vector processor operation circuit utilized by the first vector processing command chain and (2) a quantity of vector sub-segments into which the first vector data is divided, each sub-segment being no more than a maximum quantity of elements that the vector processor operation circuit can process in parallel; and
      generating control signals to the selector circuit, thereby causing the selector circuit to provide input to at least some of the plurality of vector processor operation circuits, in accordance with generated busy count values for vector processor operation circuits utilized by the first vector processing command chain.

2. The processor circuit of claim 1, wherein the scheduler circuit is adapted to determine in real time a schedule for controlling the selector circuit to configure the vector processing pipeline.

3. The processor circuit of claim 1, wherein the selector circuit comprises a plurality of multiplexor circuits coupled to the plurality of vector processor operation circuits, wherein the multiplexor circuits are adapted to selectively configure the vector processing pipeline.

4. The processor circuit of claim 3, wherein each multiplexor circuit comprises a control terminal coupled to receive a corresponding control signal from the scheduler circuit.

5. The processor circuit of claim 1, wherein the plurality of vector processor operation circuits comprise one or more of an element-wise vector multiplication circuit, a vector addition/subtraction circuit, and a vector non-linear processing circuit.

6. The processor circuit of claim 1, wherein each of the plurality of vector processor operation circuits comprise any of floating point, block floating point, and integer fixed point processor circuits.

7. The processor circuit of claim 1, further comprising a vector register file coupled to one of the vector processor operation circuits.

8. The processor circuit of claim 1, wherein the plurality of vector processing pipelines comprise machine learning algorithms.

9. The processor circuit of claim 1, wherein the processor circuit is implemented in a hardware accelerator circuit.

10. The processor circuit of claim 1, wherein the processor circuit is implemented in one or more of a field programmable gate array device, an application-specific integrated circuit device, a graphics processing unit, a massively parallel processor array device, an application-specific standard product device, a system-on-a-chip device, a complex programmable logic device, and a custom integrated circuit.

11. A computing device comprising:
   a hardware accelerator comprising hardware logic circuitry configured to perform a plurality of vector processing operations on input vectors, the hardware accelerator comprising:
      a vector processor comprising hardware logic circuitry configured to provide a plurality of vector processor operation circuits; and
      a scheduler comprising hardware logic circuitry configured to perform steps comprising:
         calculate a chain delay latency value for each vector processor operation circuit utilized by a first vector processing command chain, wherein a chain delay latency value for a vector processor operation circuit indicates a quantity of clock cycles that elapse before a first sub-segment of a first vector data associated with the first vector processing command chain arrives at the vector processor operation circuit
         generate a busy count value for the each vector processor operation circuit utilized by the first vector processing command chain, the busy count value being based on both: (1) the calculated chain delay latency value for the each vector processor operation circuit utilized by the first vector processing command chain and (2) a quantity of vector sub-segments into which the first vector data is divided, each sub-segment being no more than a maximum quantity of elements that the vector processor operation circuit can process in parallel; and provide input to at least some of the plurality of vector processor operation circuits in accordance with generated busy count values for vector processor operation circuits utilized by the first vector processing command chain.

12. The computing device of claim 11, wherein the plurality of vector processor operation circuits comprise one or more of an element-wise vector multiplication circuit, a vector addition/subtraction circuit, and a vector non-linear processing circuit.

13. The computing device of claim 11, wherein the plurality of vector processing pipelines comprise machine learning algorithms.

14. A method comprising:
using hardware logic circuitry to perform a plurality of vector processing operations on input vectors, the hardware logic circuitry comprising:
a vector processor comprising hardware logic circuitry configured to provide a plurality of vector processor operation circuits; and
a scheduler comprising hardware logic circuitry configured to schedule performance of the plurality of vector processing operations by the plurality of vector processor operation circuits, the method comprising:
calculating, with the scheduler, a chain delay latency value for each vector processor operation circuit utilized by a first vector processing command chain, wherein a chain delay latency value for a vector processor operation circuit indicates a quantity of clock cycles that elapse before a first sub-segment of a first vector data associated with the first vector processing command chain arrives at the vector processor operation circuit;
generating, with the scheduler, a busy count value for the each vector processor operation circuit utilized by the first vector processing command chain, the busy count value being based on both: (1) the calculated chain delay latency value for the each vector processor operation circuit utilized by the first vector processing command chain and (2) a quantity of vector sub-segments into which the first vector data is divided, each sub-segment being no more than a maximum quantity of elements that the vector processor operation circuit can process in parallel; and
provide, with the scheduler, input to at least some of the plurality of vector processor operation circuits, in accordance with generated busy count values for vector processor operation circuit utilized by the first vector processing command chain.

15. The method of claim 14, further comprising implementing the hardware logic circuitry on one or more of a field programmable gate array device, an application-specific integrated circuit device, a graphics processing unit device, a massively parallel processor array device, an application-specific standard product device, a system-on-a-chip device, a complex programmable logic device, and a custom integrated circuit.

16. The processor circuit of claim 1, wherein the scheduler circuit performs further steps comprising:
calculating a chain delay latency value for each vector processor operation circuit utilized by a next successive vector processing command chain;

comparing the busy count values for the each vector processor operation circuit utilized by the first vector processing command chain to the chain delay latency values for the each vector processor operation circuit utilized by the next successive vector processing command chain; and
scheduling the next successive vector processing command chain to be processed by the processor circuit based on the comparing.

17. The computing device of claim 11, wherein the scheduler comprises further hardware logic circuitry configured to perform steps comprising:
calculate a chain delay latency value for each vector processor operation circuit utilized by a next successive vector processing command chain;
compare the busy count values for the each vector processor operation circuit utilized by the first vector processing command chain to the chain delay latency values for the each vector processor operation circuit utilized by the next successive vector processing command chain; and
schedule the next successive vector processing command chain to be processed by the processor circuit based on the comparing.

18. The computing device of claim 11, wherein the hardware accelerator further comprises:
an input terminal and an output terminal; and
a selector circuit coupled to the input terminal, the output terminal, and each of the vector processor operation circuits;
wherein the providing, by the scheduler, the input to the at least some of the plurality of vector processor operation circuits comprises generating, by the scheduler, control signals to the selector circuit, thereby causing the selector circuit to provide the input to the at least some of the plurality of vector processor operation circuits.

19. The method of claim 14, further comprising:
calculating, with the scheduler, a chain delay latency value for each vector processor operation circuit utilized by a next successive vector processing command chain;
comparing, with the scheduler, the busy count values for the each vector processor operation circuit utilized by the first vector processing command chain to the chain delay latency values for the each vector processor operation circuit utilized by the next successive vector processing command chain; and
scheduling, with the scheduler, the next successive vector processing command chain to be processed by the processor circuit based on the comparing.

20. The method of claim 14, wherein the hardware logic circuitry further comprises:
an input terminal and an output terminal; and
a selector circuit coupled to the input terminal, the output terminal, and each of the vector processor operation circuits;
wherein the providing, with the scheduler, the input to the at least some of the plurality of vector processor operation circuits comprises generating, with the scheduler, control signals to the selector circuit, thereby causing the selector circuit to provide the input to the at least some of the plurality of vector processor operation circuits.

* * * * *